(12) United States Patent
Docherty et al.

(10) Patent No.: US 12,587,711 B2
(45) Date of Patent: Mar. 24, 2026

(54) SYSTEM AND METHOD FOR CONFIGURING A CONTENT SELECTION INTERFACE

(71) Applicant: ThinkAnalytics Ltd., Glasgow (GB)

(72) Inventors: Peter Docherty, Glasgow (GB); Christopher McGuire, Glasgow (GB); Asim Ullah, Glasgow (GB); David Wilkie, Glasgow (GB); Gordon McIntyre, Glasgow (GB)

(73) Assignee: ThinkAnalytics Ltd., Glasgow (GB)

( * ) Notice: Subject to any disclaimer, the term of this patent is extended or adjusted under 35 U.S.C. 154(b) by 7 days.

(21) Appl. No.: 18/230,022

(22) Filed: Aug. 3, 2023

(65) Prior Publication Data

US 2025/0047950 A1 Feb. 6, 2025

(51) Int. Cl.
| | |
|---|---|
| *H04N 5/445* | (2011.01) |
| *H04N 21/442* | (2011.01) |
| *H04N 21/482* | (2011.01) |

(52) U.S. Cl.
CPC ... *H04N 21/4826* (2013.01); *H04N 21/44204* (2013.01)

(58) Field of Classification Search
CPC ..................... H04N 21/4826; H04N 21/44204
See application file for complete search history.

(56) References Cited

U.S. PATENT DOCUMENTS

| | | | |
|---|---|---|---|
| 6,567,814 | B1 | 5/2003 | Bankier et al. |
| 7,805,129 | B1 | 9/2010 | Issa et al. |

| | | | |
|---|---|---|---|
| 9,699,491 | B1 | 7/2017 | Docherty et al. |
| 9,756,390 | B1 | 9/2017 | Docherty et al. |
| 9,906,837 | B1 | 2/2018 | Docherty et al. |
| 9,973,797 | B1 | 5/2018 | Docherty et al. |
| 10,091,555 | B1 | 10/2018 | Docherty et al. |
| 10,289,739 | B1 | 5/2019 | Docherty et al. |
| 10,356,035 | B1 | 7/2019 | Gravino et al. |
| 10,412,454 | B2 | 9/2019 | Docherty et al. |
| 10,986,406 | B2 * | 4/2021 | Kim ................ H04N 21/47202 |
| 11,212,584 | B2 | 12/2021 | Docherty et al. |
| 11,343,573 | B2 | 5/2022 | Docherty et al. |

(Continued)

FOREIGN PATENT DOCUMENTS

| | | |
|---|---|---|
| EP | 1 317 143 A1 | 6/2003 |
| EP | 2 207 348 A2 | 7/2010 |

(Continued)

*Primary Examiner* — Annan Q Shang
(74) *Attorney, Agent, or Firm* — Foley & Lardner LLP

(57) ABSTRACT

A content selection interface configuration system for configuring a content selection interface allowing user selection of content presented for viewing, the content selection interface configuration system configured to: provide one or more groups of content, each group of content including a plurality of content items; obtain data indicating at least one property of the content items of each group of content; obtain user activity including interactions by the user with content on a content selection interface; and determine a score each group of content of the plurality of groups of content based at least in part on the user activity of that user and the data indicating the at least one property of some or all of the content, wherein the score is indicative of a likely interest of the content in that group of content to one or more users of the content selection interface.

18 Claims, 10 Drawing Sheets

(56) References Cited

U.S. PATENT DOCUMENTS

| | | | |
|---|---|---|---|
| 2003/0106064 A1 | 6/2003 | Plourde | |
| 2007/0157222 A1 | 7/2007 | Cordray et al. | |
| 2007/0276756 A1* | 11/2007 | Terao | G11B 20/0021 |
| 2008/0304812 A1 | 12/2008 | Jin | |
| 2010/0005492 A1 | 1/2010 | Takano et al. | |
| 2010/0070507 A1 | 3/2010 | Mori | |
| 2010/0287588 A1* | 11/2010 | Cox | H04N 21/4668 |
| | | | 725/40 |
| 2011/0243529 A1 | 10/2011 | Oryoji et al. | |
| 2013/0186061 A1 | 7/2013 | Jarzombek et al. | |
| 2014/0149344 A1 | 5/2014 | Pudipeddi et al. | |
| 2014/0279756 A1 | 9/2014 | Whitman | |
| 2015/0082330 A1 | 3/2015 | Yun et al. | |
| 2015/0100987 A1 | 4/2015 | Whitman et al. | |
| 2015/0269488 A1 | 9/2015 | Galai et al. | |
| 2015/0325268 A1* | 11/2015 | Berger | H04N 21/4335 |
| | | | 386/248 |
| 2015/0365725 A1* | 12/2015 | Belyaev | H04N 21/6175 |
| | | | 725/46 |
| 2016/0309212 A1* | 10/2016 | Martch | H04N 21/812 |
| 2017/0006322 A1* | 1/2017 | Dury | H04N 21/254 |
| 2017/0311015 A1 | 10/2017 | Docherty et al. | |
| 2018/0113579 A1* | 4/2018 | Johnston | G06F 3/0482 |
| 2019/0045250 A1* | 2/2019 | Shapiro | H04N 21/4826 |
| 2020/0252690 A1 | 8/2020 | Docherty et al. | |

FOREIGN PATENT DOCUMENTS

| | | |
|---|---|---|
| GB | 2 574 581 A | 12/2019 |
| WO | WO-01/15449 A1 | 3/2001 |
| WO | WO-02/27526 A1 | 4/2002 |
| WO | WO-2008/042242 A2 | 4/2008 |
| WO | WO-2013/130834 A1 | 9/2013 |

* cited by examiner

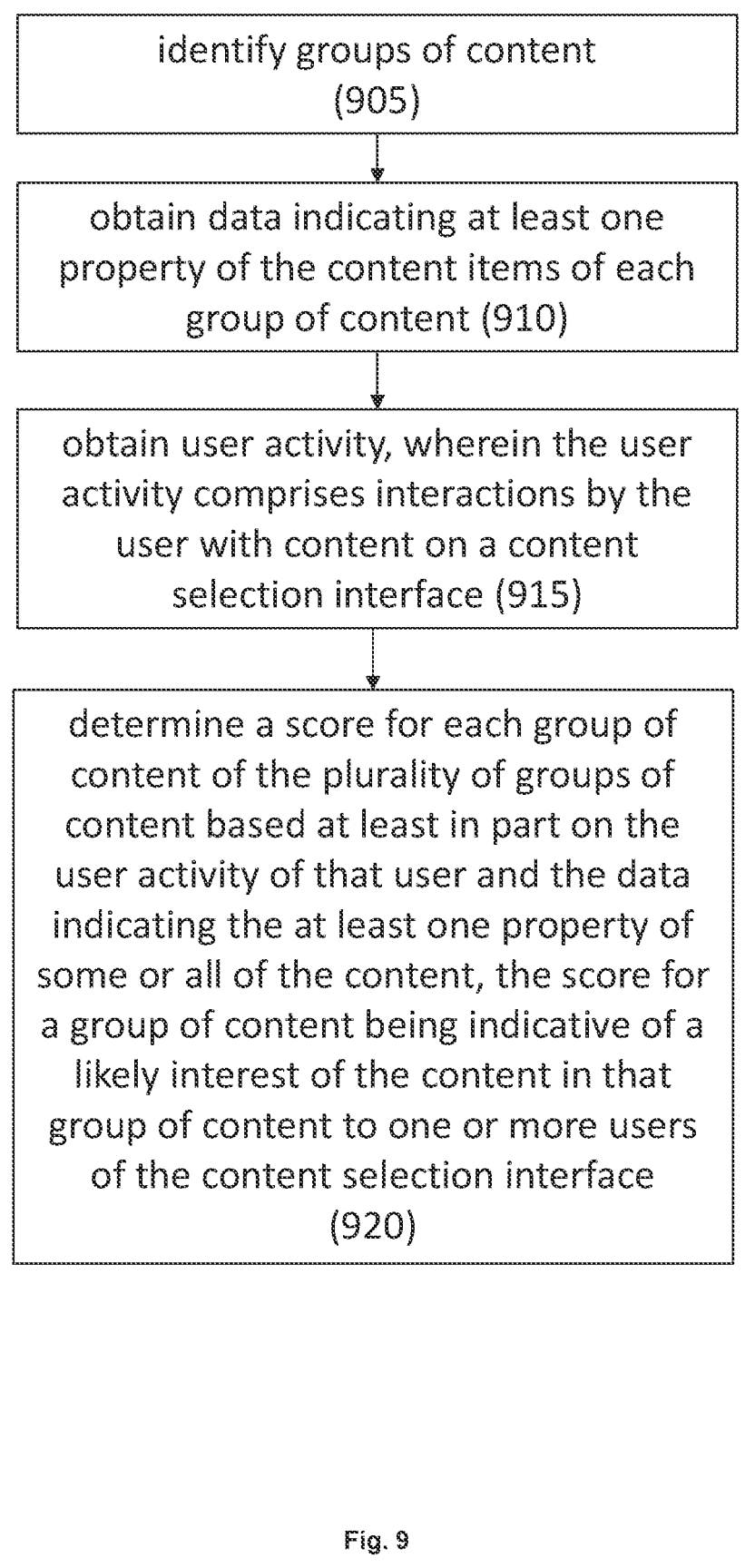

Use Case Id: War Movies        Client type: 103 identify groups of content
(905)

obtain data indicating at least one property of the content items of each group of content (910)

obtain user activity, wherein the user activity comprises interactions by the user with content on a content selection interface (915)

determine a score for each group of content of the plurality of groups of content based at least in part on the user activity of that user and the data indicating the at least one property of some or all of the content, the score for a group of content being indicative of a likely interest of the content in that group of content to one or more users of the content selection interface (920)

Fig. 9

| Session ID | Activity ID | Rating Date | Content Item ID | Content Item Title | Content Item Group ID | Rating | Scaled Rating | Feature Ratings | Content Source ID | Channel ID | Status | Entry Date |
|---|---|---|---|---|---|---|---|---|---|---|---|---|
| Personalised | 5 | 2022-06-22 21:48:22 | sdf879s7fs7f | SDGSJHDGSJ | FJLSKJF | 5 | 1.00 | movies@comedy, 1.1 | 2 | 3 | 1 | 23-09-22 16:42:01 |
| Personalised | 5 | 2022-06-22 21:48:22 | fs9f0s98f09d | SDJHJSER | DFLSDKFJ | 5 | 1.00 | movies@drama, 1.2 | 2 | 2 | 1 | 23-09-22 16:42:01 |
| Personalised | 5 | 2022-06-22 21:48:22 | f98sd0f98s0 | OPFIDOI | SKDFLJ | 5 | 1.00 | 80s music, 1.2,fmt: electropop, 1.0, aud:40s-50s | 2 | 2 | 1 | 23-09-22 16:42:01 |
| Personalised | 5 | 2022-06-22 21:48:22 | sdf09s8f08s | FDOEJO | DLFKJ | 5 | 1.00 | news@currentaff airs,1.4, fmt: news, 1.0, sub.international: 0.8 | 1 | 1 | 1 | 23-09-22 16:42:01 |
| Personalised | 5 | 2022-06-22 21:48:22 | sd09fs098 | OOEJEKRJ | LLKFJSDKJ | 5 | 1.00 | movies@drama, 1.2, sub: football, 1.0 | 1 | 1 | 1 | 23-09-22 16:42:01 |

Fig. 11

SYSTEM AND METHOD FOR CONFIGURING A CONTENT SELECTION INTERFACE

TECHNICAL FIELD

The present disclosure relates to a system and method for use in configuring content selection interfaces, such as but not limited to electronic program guides. Particularly but not exclusively, the present disclosure provides systems for assisting in the creation of groups of content (e.g. campaigns) by operators for provision on a content selection interface.

BACKGROUND

Developments in technology mean that users are able to access content via a wide array of different mechanisms, and via a wide array of different sources. For example, television channels, radio stations, video-on-demand and other streaming services, social media and other internet content sources provide a vast array of content available to a user.

By providing a large volume of content, content distribution platforms can cater to a large range of different user preferences and provide content previously unseen to a user to hold the user's interest. However, the large volumes of available content give rise to challenges in making it easy for users to identify, navigate and select content. These challenges may be exacerbated by technical limitations such as limited screen estate for providing electronic program guides.

Electronic program guides and other content selection interfaces can be structured to improve navigation. For example, one arrangement is to provide a content selection interface having multiple "carousels", each carousel comprising a group of content containing multiple content items that are selectable by the user. The carousels can be themed, with the content in each carousel being selected according to the theme for the carousel. Examples of themes include different genre types such as "action", "romance", "sci-fi", and the like. Other examples of themes could include popularity based themes such as "most watched". Sometime, carousels need not be themed and a plurality of content items can simply be grouped together. A user can scroll up or down through carousels, and side to side through the content items in any carousel in order to identify a content item for selection.

It may be beneficial to make it easier to configure content selection interfaces so that a user can better or more quickly identify and select content of interest using electronic program guides and other content selection interfaces.

SUMMARY OF THE INVENTION

Content provider services may want to provide manually curated groups of content, e.g. to support a campaign or for other reasons. A group of content may be provided in an associated carousel in user interfaces. However, there may be lots of different campaigns, each with their own group of content. It may be beneficial to make groups of content more likely to be of interest to be more readily accessible on the content selection interface. For example, it may be beneficial to select groups of content that are more likely to be of interest and/or to provide the carrousels with groups of content more likely to be of interest more prominently than those less likely to be of interest.

Content selection interfaces can allow users to conveniently identify and select content for consumption. However, there are technical challenges posed by the likes of the sheer volume of content available and the limitations on on-screen area of many user devices for presenting the content selection interface. Furthermore, being able to access and use the content selection interface with as little lag as possible, may make overly large, complex or inefficient processes for providing the content selection interface undesirable. Given the vast numbers of users and requests, ultra-fast response times in the order of milliseconds are highly desirable. The content selection interfaces can be configured at a provider side, e.g. at a service or content provider side, which may be a server side. However, sub-optimal configuration of the user interfaces at the provider side can have a significant effect on the subsequent effectiveness of the content selection interface. For example, sub-optimal configuration of the user interfaces at the provider side can result in it being harder, or at least take longer, for users to identify and select content of interest. As such, improvements in the configuration of content selection interfaces, e.g. at the provider side, in order to enhance the ability of a user to search for content stored by, and available from, computer may be beneficial.

Tracking, recording and processing large volumes of customer data together with large amounts of content data within reasonable time constraints and with acceptable accuracy poses a significant technical challenge. The time constraints demanded by particular content providers, or expected by users, may be particularly demanding This can present a significant technical challenge, particularly as the system is usually hosted on one or more servers remote from the set top box or other device and, for systems with millions of subscribers, may have to deal simultaneously with millions of user actions or interactions per minute during busy periods.

The following are provided as examples of the present disclosure. According to a first example of the present disclosure is a content selection interface configuration system for configuring a content selection interface that allows user selection of content presented for viewing, the content selection interface configuration system configured to: provide one or more groups of content, each group of content comprising a plurality of content items; obtain data indicating at least one property of the content items of each group of content; obtain user activity, wherein the user activity comprises interactions by the user with content on a content selection interface; and ordering and/or scoring each group of content of the plurality of groups of content based at least in part on the user activity of that user and the data indicating the at least one property of some or all of the content.

The score for a group of content may be indicative of a likely interest of the content in that group of content to one or more users of the content selection interface, which may be or comprise users of a content provision service whose content is selectable through the content selection interface. The score for a group of content may be indicative of a likely interest of the content in that group of content to individual users, groups of users or a whole corpus of users, such as a whole user base of the content provision service.

The content selection interface configuration system may be, comprise or be comprised in a user experience (UX) engine, such as a UX engine of a content recommendation system.

The at least one property of the content items may comprise data describing at least one of: an aspect, property or descriptor of the content such as program title, time, duration, content type, program categorization, actor names, genre, release date, episode number, series number, and/or the like.

The user activity may be indicative of an interaction with at least one item of content. Examples of user actions that constitute user activity that can be collected include one or more or each of: selecting content from a group of content or a related group of content; scrolling through content in a group of content or a related group of content; hovering a cursor for greater than a threshold period over a group of content or a related group of content; pausing scrolling for greater than a threshold period through groups of content whilst a group of content or a related group of content is displayed on a user interface; downloading content that is in a group of content or related group of content; having watched at least part of content that is in a group of content or related group of content; bookmarking content that is in a group of content or related group of content; browsing content that is in a group of content or related group of content; recording content that is in a group of content or related group of content; adding content that is in a group of content or related group of content to virtual shopping basket or otherwise selecting for purchase or potential purchase; watching or listening to a trailer for content that is in a group of content or related group of content; playing content that is in a group of content or related group of content on a user device; purchasing content that is in a group of content or related group of content; clicking on or otherwise selecting content that is in a group of content or related group of content from a list of search results; remotely recording content that is in a group of content or related group of content; setting a reminder for content that is in a group of content or related group of content; liking, making a favorite or otherwise adding to a list content that is in a group of content or related group of content; disliking content that is in a group of content or related group of content; messaging about content that is in a group of content or related group of content; posting on social media about content that is in a group of content or related group of content; playing purchased content that is in a group of content or related group of content; stopping watching or playing content that is in a group of content or related group of content; and/or rating content that is in a group of content or related group of content, from amongst others.

The determining of the score of the groups of content may comprise comparing the at least one property of the content of the group with properties of the content with which the user has interacted, i.e. the content to which the user activity relates. The determining of the score of the groups of content may comprise determining a similarity between the at least one property of the content in the group of content with the properties of the content with which the user has interacted, e.g. with a greater similarity resulting in a higher score. The similarity may comprise a distance metric or the like.

The content selection interface configuration system may be configured to select, e.g. automatically select, or receive selection of groups of content based on the score of the groups of content. The content selection interface configuration system may be configured to select, e.g. automatically select, or receive selection of groups of content having a score above a threshold. The content selection interface configuration system may be configured to select, e.g. automatically select, or receive selection of groups of content of a set or preset number of groups of content with highest scores. The selection, e.g. automatically selection, or selections of groups of content received may be of a subset of available groups of content, e.g. a selection of one or more but less than all of the available groups of content. The content selection interface configuration system may be configured to order groups of content based on the score of the groups of content, e.g. such that groups of content having a higher score are displayed sooner, or more prominently or more accessibly than groups of content having a lower score.

The groups of content that are selectable may be or comprise operator created groups of content. Some positions for groups of content in the content selection interface may be allocated or allocatable to operator created groups of content. Some positions for groups of content in the content selection interface may be allocated or allocatable to dynamically positioned or positionable groups of content. The content selection interface configuration system may be configured to allocate and/or order the operator created groups in the positions for groups of content in the content selection interface allocated or allocatable to operator created groups of content according to their score. Dynamically positioned groups of content may be positioned using different considerations, such as those described in U.S. Ser. No. 18/130,891 in the name of the present applicant, the content of which are incorporated in their entirety as if set out in full herein. The operators may act on behalf of or be authorized by a content provision system or content selection interface provider to create and/or deploy groups of content to content selection interfaces.

The content selection interface configuration system may be configured to display the score of each group of content, e.g. in a configuration interface for configuring groups of content for provision in the content selection interface. In this way, operators when creating or selecting groups of content can receive an indication of the likely interest in those groups of content before deploying the groups of content to content selection interfaces. This may save time and resource in deploying groups of content and may result in a content selection interface for which a user can more readily and expediently identify content of interest.

The configuration interface may be a user interface of the content selection interface configuration system, which may be part of a content provision system or a 3rd party system. The configuration interface may be configured to receive input from operators for selecting which groups of content to display. The configuration interface may be configured to receive input from operators for selecting an order of groups of content to display. The configuration interface may be configured to receive input from operators for indicating that selected groups of content should be displayed. The selection of which groups to display may be determined based on the displayed score for each group of content. The configuration interface may be configured for creation of groups of content, e.g. by selecting or receiving selections of content for including in a group of content.

The content selection interface configuration system may be configured to implement rules for selecting groups of content. In the event of a conflict, the rules may over-ride the selection of content based on the score. The rules may comprise hard rules, e.g. they are followed regardless of score. The rules may comprise soft rules, e.g. that adjust or weight the score. The rules may specify one or more properties of groups of content or the content therein that is not selectable (or selectable) for users or groups of users meeting one or more criteria. For example the one or more properties may comprise genre, age rating, violence rating, censor rating, or the like, and the one or more criteria may specify a demographic property such as age or age range, or the like. In this way, provision of groups of content relating to horror, violent or adult themed content to certain user groups, such as young users, may be avoided.

The content within groups of content may be ordered according to one or more criteria, e.g. in an order specified by the operator, according to user preference of the user or group of users using the content selection interface, by date (e.g. recency), and/or the like. The content within groups of content may be ordered according to different criteria to the criteria used to select or order the groups of content.

The content selection interface configuration system can be on a provider side or as middleware or as a $3^{rd}$ party system of a service provider to the content provider, e.g. at a service or content provider side, which may be a server side. In contrast, the content selection interfaces that are operated to select content may be provided on a user device, such as a user device on which the content selected using the content selection interface is provided.

The content selection interface may be configured to allow user selection of the presented content for viewing, e.g. on a user device, such as a user device on which the content selection interface is provided. The content selection interface may be configured to display indications of at least some of the content in groups of content, wherein the indications of content may be selectable in order to provide the selected content, e.g. to selectively download, stream and/or playback the selected content, which may be on a user device, such as a user device on which the content selection interface is provided.

The content selection interface may comprise a plurality of scrollable carousels. Each carousel may display an associated group of content. The method may comprise providing indications of the content of the associated group of content to the user in respective carousels of the user interface. The ordering of the groups of content may comprise ordering the carousels in the user interface. The user interface may be configured to allow scrolling through different carousels. The user interface may be configured to allow scrolling through content within individual carousels. The ordering of the carousels may be based at least in part on the user activity.

The system may be configured to monitor or receive user interactions with groups of content on a user interface. The user activity may comprise one or more user actions. The user interaction with groups of content on the user interface may comprise one or more of: selecting content from a group of content or a related group of content; scrolling through content in a group of content or a related group of content; hovering a cursor for greater than a threshold period over a group of content or a related group of content; pausing scrolling for greater than a threshold period through groups of content whilst a group of content or a related group of content is displayed on a user interface; downloading content that is in a group of content or related group of content; watching at least part of content that is in a group of content or related group of content; bookmarking content that is in a group of content or related group of content; browsing content that is in a group of content or related group of content; recording content that is in a group of content or related group of content; adding content that is in a group of content or related group of content to a virtual shopping basket or otherwise selecting the content for purchase or potential purchase; watching or listening to a trailer for content that is in a group of content or related group of content; playing content that is in a group of content or related group of content on a user device; purchasing content that is in a group of content or related group of content; clicking on or otherwise selecting content that is in a group of content or related group of content from a list of search results; remotely recording content that is in a group of content or related group of content; setting a reminder for content that is in a group of content or related group of content; liking, making a favorite or otherwise adding to a list content that is in a group of content or related group of content; disliking content that is in a group of content or related group of content; messaging about content that is in a group of content or related group of content; posting on social media about content that is in a group of content or related group of content; playing purchased content that is in a group of content or related group of content; stopping watching or playing content that is in a group of content or related group of content; rating content that is in a group of content or related group of content; and/or the like. The user interactions may be used to form or may be comprised in the user activity.

The related group of content may be a group of content having the same or a related theme or comprising at least one content item in common.

Determining the scores of the groups of content for presentation to the user on the user interface may comprise applying a ranker, which may implement a ranking algorithm, machine learning model or the like, to the user activity. The ranking algorithm may be configured to rank the available groups of content with respect to the user activity. Determining the scores for the groups of content may comprise determining a similarity between the at least one aspect, property or descriptor of the content in the group and the at least one aspect, property or descriptor of the content determined based on the user activity. The score may be based on or representative of a degree of the similarity.

The determining of the score of the groups of content for presentation to the user on the user interface for a user may comprise giving a high score for groups of content for which there have been a higher number of interactions by that user than the score given to groups of content for which there have been a lower number of interactions by that user. The score given to a given group may reflect or depend at least in part on the number of interactions by that user with content in the group of content on a content selection interface. The score may reflect or depend at least in part on context data. The context data may comprise or be reflective of variable influences on user content selections. The context data may comprise one or more of: weather data, time of day data, date data, season data, current affairs data, trending topic data, a list of preferential themes or topics, and/or the like. The ranker may have the context data as inputs in addition to the user activity.

The content selection interface may be a content selection interface of an electronic program guide, EPG. The system may be comprised in or for use with a content provision system for providing television content or other content to each of a plurality of users. The content selection interface may be a content selection interface of a different type of content provision system, such as an article selection system, a music selection system, a video game selection system, a film selection system, a written content selection system, an image selection system, and/or the like. A user device of each user may display the content selection interface. The content selection interface may be operable by the user of the user device to select one or more items of television or other content. A content distribution system may be configured to, in response to the selection, distribute the selected items of television content or other content to the user devices for viewing by the users during content viewing sessions.

The score of the groups of content may be based on data of a content distribution system or middleware operator and may not comprise $3^{rd}$ party data. The content selection interface configuration system may be comprised in a middleware system that sits between the users and a content provider system. The content selection interface configuration system may be comprised in a content provider system.

At least one or each group of content may be a group in which content in the group is related by a common theme. At least one or each group of content may be a group of content selected by a user, i.e. a user may select the content that is contained in a group of content. At least one or each group of content may be a group of content selected by a recommendation system for a user, e.g. based on prior user activity.

The score of the groups of content may be based at least in part on the user activity of that user and other data, such as the context data. For example, the method may comprise providing mapping data mapping the context data to groups of content or themes of groups of content for preferential ordering.

The content selection interface configuration system may comprise a device, such as a cloud computing resource or other network enabled device, comprising or configured to implement the system of the second example. The content selection interface configuration system may be implemented by a suitable program or application running on the device. The device may comprise at least one processor, such as a central processing unit (CPU), maths co-processor (MCP), graphics processing unit (GPU), tensor processing unit (TPU) and/or the like. The at least one processor may be a single core or multicore processor. The device may comprise memory and/or other data storage, which may be implemented on DRAM (dynamic random access memory), SSD (solid state drive), HDD (hard disk drive) or other suitable magnetic, optical and/or electronic memory device. The at least one processor and/or the memory and/or data storage may be arranged locally, e.g. provided in a single device or in multiple devices in in communication at a single location or may be distributed over several local and/or remote devices. The device may comprise a communications module, e.g. a wireless and/or wired communications module. The communications module may be configured to communicate over a cellular communications network, Wi-Fi, Bluetooth, ZigBee, near field communications (NFC), IR, satellite communications, other internet enabling networks and/or the like. The communications module may be configured to communicate via Ethernet or other wired network or connections, via a telecommunications network such as a POTS, PSTN, DSL, ADSL, optical carrier line, and/or ISDN link or network and/or the like, via the cloud and/or via the internet, or other suitable data carrying network. The communications module may be configured to communicate via optical communications such as optical wireless communications (OWC), optical free space communications or Li-Fi or via optical fibers and/or the like. The device and/or the controller or the at least one processor or processing unit may be configured to communicate with the remote server or data store via the communications module. The controller or processing unit may comprise or be implemented using the at least one processor, the memory and/or other data storage and/or the communications module of the device.

According to a second example of the present disclosure is a method comprising configuring a content selection interface that allows user selection of content presented for viewing, the configuring being performed by or using a content selection interface configuration system, the method comprising:

providing one or more groups of content, each group of content comprising a plurality of content items;

obtaining data indicating at least one property of the content items of each group of content;

obtaining user activity, wherein the user activity comprises interactions by the user with content on a content selection interface; and determining a score each group of content of the plurality of groups of content based at least in part on the user activity of that user and the data indicating the at least one property of some or all of the content.

The method may be implemented using or as part of a selection user interface of a user experience (UX) engine, the selection user interface being for allowing operatives of the UX engine to create and/or configure content selection interfaces for provision to users to allow the users to select content.

The score for a group of content may be indicative of a likely interest of the content in that group of content to one or more users of the content selection interface, which may be or comprise users of a content provision service whose content is selectable through the content selection interface. The score for a group of content may be indicative of a likely interest of the content in that group of content to individual users, groups of users or a whole corpus of users, such as a whole user base of the content provision service.

The at least one property of the content items may comprise data describing at least one of: an aspect, property or descriptor of the content such as program title, time, duration, content type, program categorization, actor names, genre, release date, episode number, series number, and/or the like.

The user activity may be indicative of an interaction with at least one item of content. Examples of user actions that constitute user activity that can be collected include one or more or each of: selecting content from a group of content or a related group of content; scrolling through content in a group of content or a related group of content; hovering a cursor for greater than a threshold period over a group of content or a related group of content; pausing scrolling for greater than a threshold period through groups of content whilst a group of content or a related group of content is displayed on a user interface; downloading content that is in a group of content or related group of content; having watched at least part of content that is in a group of content or related group of content; bookmarking content that is in a group of content or related group of content; browsing content that is in a group of content or related group of content; recording content that is in a group of content or related group of content; adding content that is in a group of content or related group of content to virtual shopping basket or otherwise selecting for purchase or potential purchase; watching or listening to a trailer for content that is in a group of content or related group of content; playing content that is in a group of content or related group of content on a user device; purchasing content that is in a group of content or related group of content; clicking on or otherwise selecting content that is in a group of content or related group of content from a list of search results; remotely recording content that is in a group of content or related group of content; setting a reminder for content that is in a group of content or related group of content; liking, making a favorite or otherwise adding to a list content that is in a group of content or related group of content; disliking content that is in a group of content or related group of content; messaging about content that is in a group of content or related group of content; posting on social media about content that is in a group of content or related group of content; playing purchased content that is in a group of content or related group of content; stopping watching or playing content that is in a group of content or related group of content; and/or rating content that is in a group of content or related group of content, from amongst others.

The determining of the score of the groups of content may comprise comparing the at least one property of the content of the group with properties of the content with which the user has interacted, i.e. the content to which the user activity relates. The determining of the score of the groups of content may comprise determining a similarity between the at least one property of the content in the group of content with the properties of the content with which the user has interacted, e.g. with a greater similarity resulting in a higher score. The similarity may comprise a distance metric or the like.

The method may comprise selecting, e.g. automatically selecting, groups of content based on the score of the groups of content. The method may comprise selecting, e.g. automatically selecting, groups of content having a score above a threshold. The method may comprise selecting, e.g. automatically selecting, groups of content of a set or preset number of groups of content with highest scores. The selection, e.g. automatically selection, of groups of content received may be of a subset of available groups of content, e.g. a selection of one or more but less than all of the available groups of content. The method may comprise ordering groups of content based on the score of the groups of content, e.g. such that groups of content having a higher score are displayed sooner, or more prominently or more accessibly than groups of content having a lower score.

The groups of content that are selectable may be or comprise operator created groups of content. Some positions for groups of content in the content selection interface may be allocated or allocatable to operator created groups of content. Some positions for groups of content in the content selection interface may be allocated or allocatable to dynamically positioned or positionable groups of content. The method may comprise allocating and/or ordering the operator created groups in the positions for groups of content in the content selection interface allocated or allocatable to operator created groups of content according to their score. Dynamically positioned groups of content may be positioned using different considerations, such as those described in U.S. Ser. No. 18/130,891 in the name of the present applicant, the content of which are incorporated in their entirety as if set out in full herein. The operators may act on behalf of or be authorized by a content provision system or content selection interface provider to create and/or deploy groups of content to content selection interfaces.

The method may comprise displaying the score of each group of content, e.g. in a configuration interface for configuring groups of content for provision in the content selection interface.

The configuration interface may be a user interface of the content selection interface configuration system, which may be part of a content provision system or a 3rd party system. The method may comprise receiving input from operators for selecting which groups of content to display. The method may comprise receiving input from operators for selecting an order of groups of content to display. The method may comprise receiving input from operators for indicating that selected groups of content should be displayed. The selection of which groups to display may be determined based on the displayed score for each group of content. The configuration interface may be configured for creation of groups of content, e.g. by selecting or receiving selections of content for including in a group of content.

The method may comprise implementing rules for selecting groups of content. In the event of a conflict, the rules may over-ride the selection of content based on the score. The rules may comprise hard rules, e.g. they are followed regardless of score. The rules may comprise soft rules, e.g. that adjust or weight the score. The rules may specify one or more properties of groups of content or the content therein that is not selectable (or selectable) for users or groups of users meeting one or more criteria. For example the one or more properties may comprise genre, age rating, violence rating, censor rating, or the like, and the one or more criteria may specify a demographic property such as age or age range, or the like. In this way, provision of groups of content relating to horror, violent or adult themed content to certain user groups, such as young users, may be avoided.

The content within groups of content may be ordered according to one or more criteria, e.g. in an order specified by the operator, according to user preference of the user or group of users using the content selection interface, by date (e.g. recency), and/or the like. The content within groups of content may be ordered according to different criteria to the criteria used to select or order the groups of content.

The content selection interface configuration system can be on a provider side or as middleware or as a $3^{rd}$ party system of a service provider to the content provider, e.g. at a service or content provider side, which may be a server side. In contrast, the content selection interfaces that are operated to select content may be provided on a user device, such as a user device on which the content selected using the content selection interface is provided.

The content selection interface may comprise a plurality of scrollable carousels. Each carousel may display an associated group of content. The method may comprise providing indications of the content of the associated group of content to the user in respective carousels of the user interface. The ordering of the groups of content may comprise ordering the carousels in the user interface. The user interface may be configured to allow scrolling through different carousels. The user interface may be configured to allow scrolling through content within individual carousels. The ordering of the carousels may be based at least in part on the user activity.

The method may comprise monitoring or receiving user interactions with groups of content on a user interface. The user activity may comprise one or more user actions. The user interaction with groups of content on the user interface may comprise one or more of: selecting content from a group of content or a related group of content; scrolling through content in a group of content or a related group of content; hovering a cursor for greater than a threshold period over a group of content or a related group of content; pausing scrolling for greater than a threshold period through groups of content whilst a group of content or a related group of content is displayed on a user interface; downloading content that is in a group of content or related group of content; watching at least part of content that is in a group of content or related group of content; bookmarking content that is in a group of content or related group of content; browsing content that is in a group of content or related group of content; recording content that is in a group of content or related group of content; adding content that is in a group of content or related group of content to a virtual shopping basket or otherwise selecting the content for purchase or potential purchase; watching or listening to a trailer for content that is in a group of content or related group of content; playing content that is in a group of content or related group of content on a user device; purchasing content that is in a group of content or related group of content; clicking on or otherwise selecting content that is in a group of content or related group of content from a list of search results; remotely recording content that is in a group of content or related group of content; setting a reminder for content that is in a group of content or related group of content; liking, making a favorite or otherwise adding to a list content that is in a group of content or related group of content; disliking content that is in a group of content or related group of content; messaging about content that is in a group of content or related group of content; posting on social media about content that is in a group of content or related group of content; playing purchased content that is in a group of content or related group of content; stopping watching or playing content that is in a group of content or related group of content; rating content that is in a group of content or related group of content; and/or the like. The user interactions may be used to form or may be comprised in the user activity.

The related group of content may be a group of content having the same or a related theme or comprising at least one content item in common.

Determining the scores of the groups of content for presentation to the user on the user interface may comprise applying a ranker, which may implement a ranking algorithm, machine learning model or the like, to the user activity. The ranking algorithm may be configured to rank the available groups of content with respect to the user activity. Determining the scores for the groups of content may comprise determining a similarity between the at least one aspect, property or descriptor of the content in the group and the at least one aspect, property or descriptor of the content determined based on the user activity. The score may be based on or representative of a degree of the similarity.

The determining of the score of the groups of content for presentation to the user on the user interface for a user may comprise giving a high score for groups of content for which there have been a higher number of interactions by that user than the score given to groups of content for which there have been a lower number of interactions by that user. The score given to a given group may reflect or depend at least in part on the number of interactions by that user with content in the group of content on a content selection interface. The score may reflect or depend at least in part on context data. The context data may comprise or be reflective of variable influences on user content selections. The context data may comprise one or more of: weather data, time of day data, date data, season data, current affairs data, trending topic data, a list of preferential themes or topics, and/or the like. The ranker may have the context data as inputs in addition to the user activity.

The content selection interface may be a content selection interface of an electronic program guide, EPG. The system may be comprised in or for use with a content provision system for providing television content or other content to each of a plurality of users. The content selection interface may be a content selection interface of a different type of content provision system, such as an article selection system, a music selection system, a video game selection system, a film selection system, a written content selection system, an image selection system, and/or the like. A user device of each user may display the content selection interface. The content selection interface may be operable by the user of the user device to select one or more items of television or other content. A content distribution system may be configured to, in response to the selection, distribute the selected items of television content or other content to the user devices for viewing by the users during content viewing sessions.

The score of the groups of content may be based on data of a content distribution system or middleware operator and may not comprise 3rd party data.

At least one or each group of content may be a group in which content in the group is related by a common theme. At least one or each group of content may be a group of content selected by a user, i.e. a user may select the content that is contained in a group of content. At least one or each group of content may be a group of content selected by a recommendation system for a user, e.g. based on prior user activity.

The score of the groups of content may be based at least in part on the user activity of that user and other data, such as the context data. For example, the method may comprise providing mapping data mapping the context data to groups of content or themes of groups of content for preferential ordering.

According to a third example of the present disclosure is a non-transitory computer-readable medium that comprises computer-readable instructions that are executable to configure a content selection interface, the configuration comprising:

providing one or more groups of content, each group of content comprising a plurality of content items;

obtaining data indicating at least one property of the content items of each group of content;

obtaining user activity, wherein the user activity comprises interactions by the user with content on a content selection interface; and determining a score each group of content of the plurality of groups of content based at least in part on the user activity of that user and the data indicating the at least one property of some or all of the content.

The computer-readable instructions may implement the method of the second aspect. The computer-readable instructions may be implemented by the system of the first aspect.

The individual features and/or combinations of features defined above in accordance with any aspect of the present invention or below in relation to any specific embodiment of the invention may be utilized, either separately and individually, alone or in combination with any other defined feature, in any other aspect or embodiment of the invention.

Furthermore, the present invention is intended to cover apparatus configured to perform any feature described herein in relation to a method and/or a method of using or producing, using or manufacturing any apparatus feature described herein.

BRIEF DESCRIPTION OF THE DRAWINGS

Various examples of the present disclosure will now be described by way of example, and with reference to the accompanying drawings, of which:

FIG. 9 is a process flow for scoring groups of content;

FIG. 11 is an example of a user activity record.

DETAILED DESCRIPTION

Figure 1:
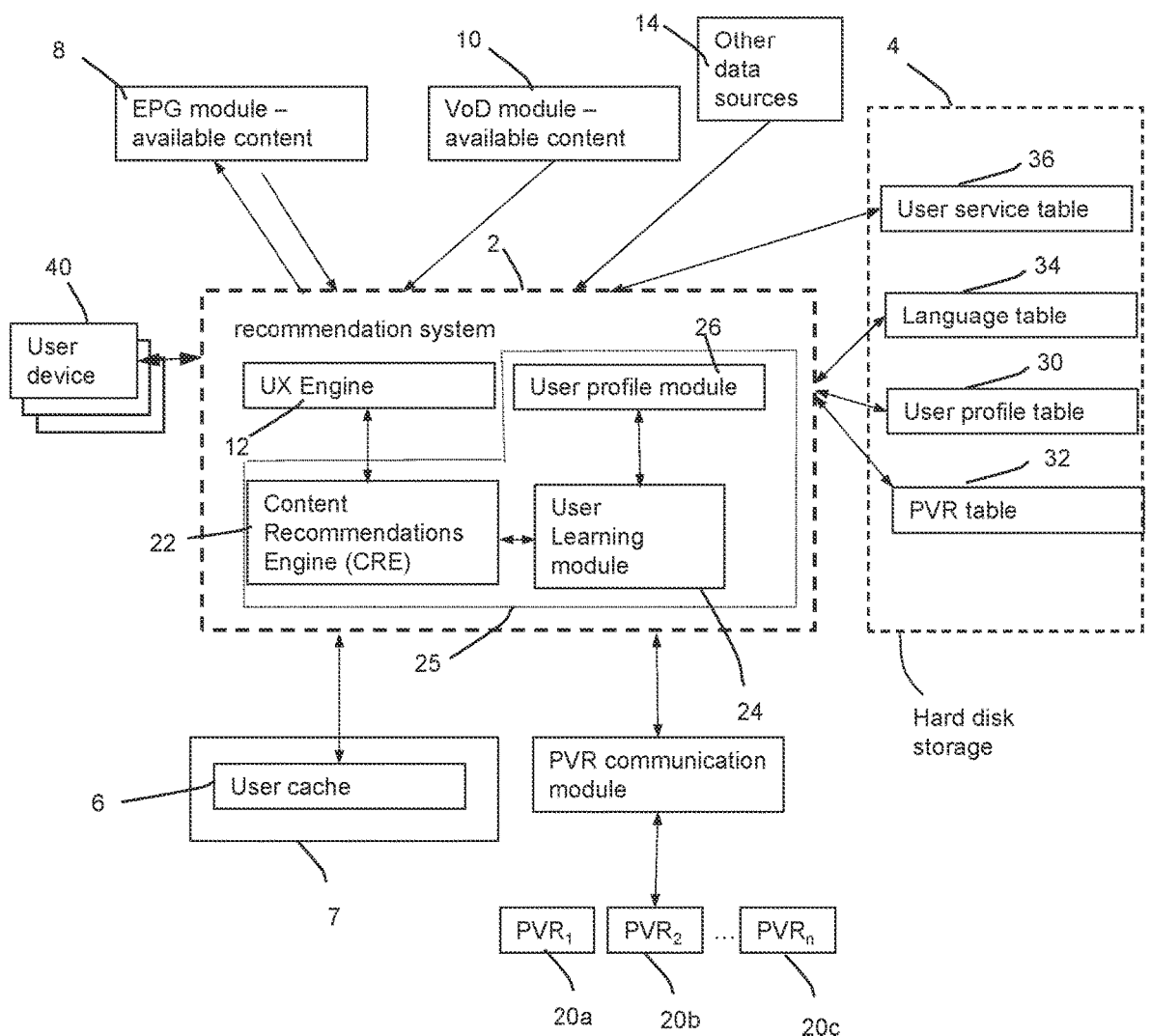
FIG. 1 is a schematic diagram of a computer system configured to provide services to a provider of a user content selection interface.

In TV systems, or other systems for provision of content to a user, each service provider may have thousands, tens or hundreds of thousands, or millions of customers, wherein each customer is unique and may have different viewing habits and preferences. Furthermore, in order to accommodate the range of tastes and interests of such a large customer base, and to keep those customer's interest, the service provider will often provide an extensive range of different content. However, the sheer volume of content available from service provider systems can present difficulties in navigating, identifying and retrieving content that the user would like to access and view. The content available to a user can be stored in a content database of a service provider, but if a user cannot readily navigate the content database to identify content of interest, then the user may get frustrated or may not fully realize the beneficial content available to them. As such, systems for allowing users to better navigate and select the content available from a content provider would be beneficial.

Content selection interfaces, such as but not limited to electronic program guides (EPGs), are generally made available for users to navigate the content available from one or more service providers. Such content selection interfaces can come in a range of forms, but one example of a content selection interface is a carousel based interface in which a number of carousels are provided in the interface, each carousel representing a group of content and containing selectable indications of each of the items of content of that group of content. The indications of the items of content are selectable by a user to access the selected content, e.g. to download, stream and/or view the selected content. Each group of content represented by the carousel may contain content linked by a theme or be otherwise grouped, e.g. by manual selection or the like. A user can scroll through the different carousels, for example by scrolling up and down through the carousels. The user can also scroll through the content in any given carousel, such as but not limited to scrolling horizontally through the different items of content in a given carousel, until they find the content that they want. It will be appreciated that the disclosure is not limited to this specific carousel arrangement. For example, the user may be able to scroll through the groups of content in one direction and scroll through the indications of content in a given group in a different direction, which may or may not be horizontal and vertical. In another example, the groups of content can be hierarchical, where a user can drill down through collections of groups of content to select a specific group of content and then select the desired item of content in that group. However, other interface arrangements are possible.

Content selection interfaces such as this have been found to be particularly helpful to viewers. However, there are technical challenges posed by the likes of the sheer volume of content available and the limitations on on-screen area of many user devices for presenting the content selection interface. Furthermore, being able to access and use the content selection interface with as little lag as possible, may make overly large, complex or inefficient processes for providing the content selection interface undesirable. As such, improvements in content selection interface in order to enhance the ability of a user to search for content stored by, and available from, a service provider's computer systems may be beneficial.

Tracking, recording and processing large volumes of customer data together with large amounts of content data within reasonable time constraints and with acceptable accuracy poses a significant technical challenge. The time constraints demanded by particular content providers, or expected by users, may be particularly demanding This can present a significant technical challenge, particularly as the system is usually hosted on one or more servers remote from the set top box or other device and, for systems with millions of subscribers, may have to deal simultaneously with millions of user actions or interactions per minute during busy periods.

Figure 2:
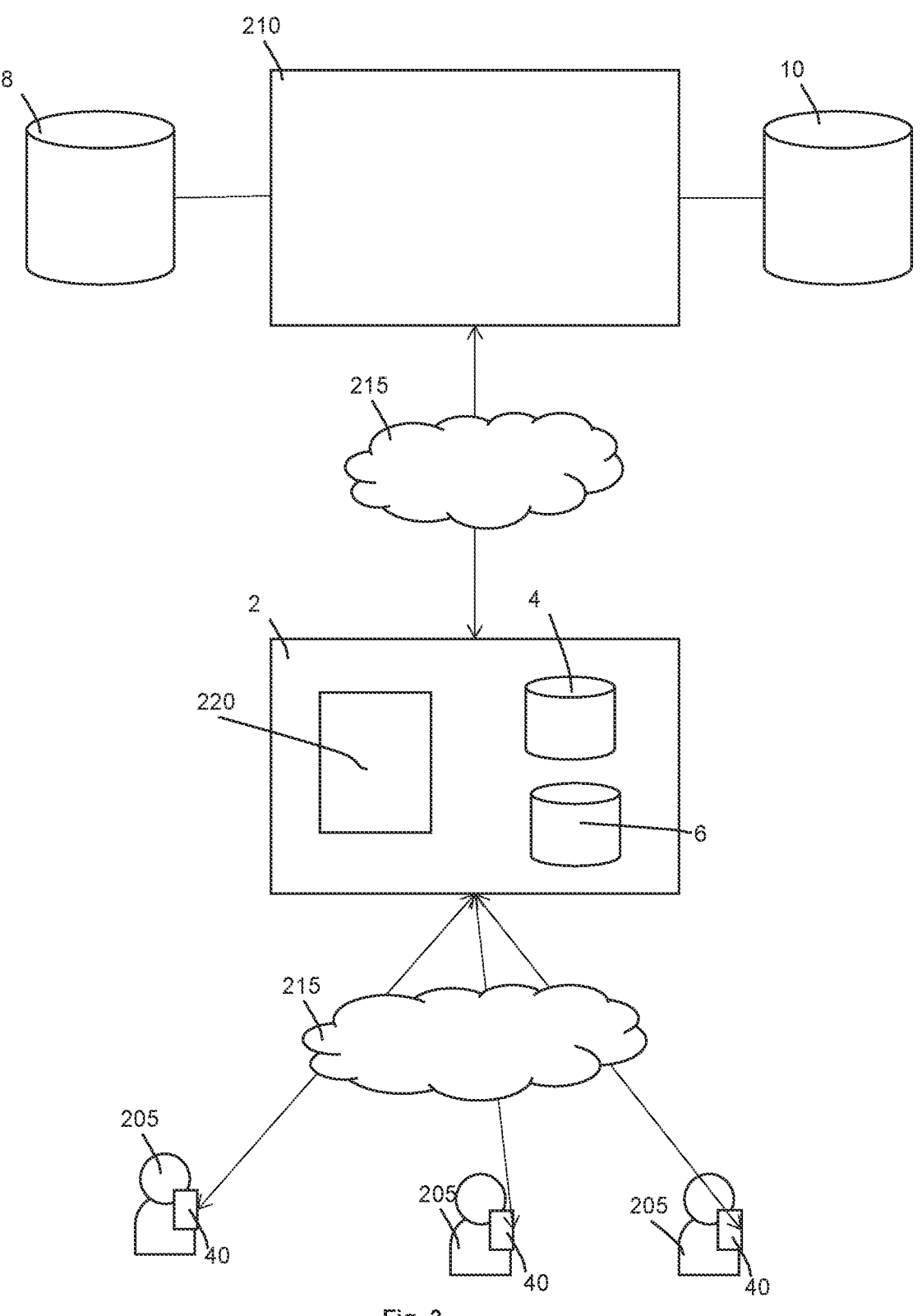
FIG. 2 is a simplified schematic of the system of FIG. 1.
Figure 3:
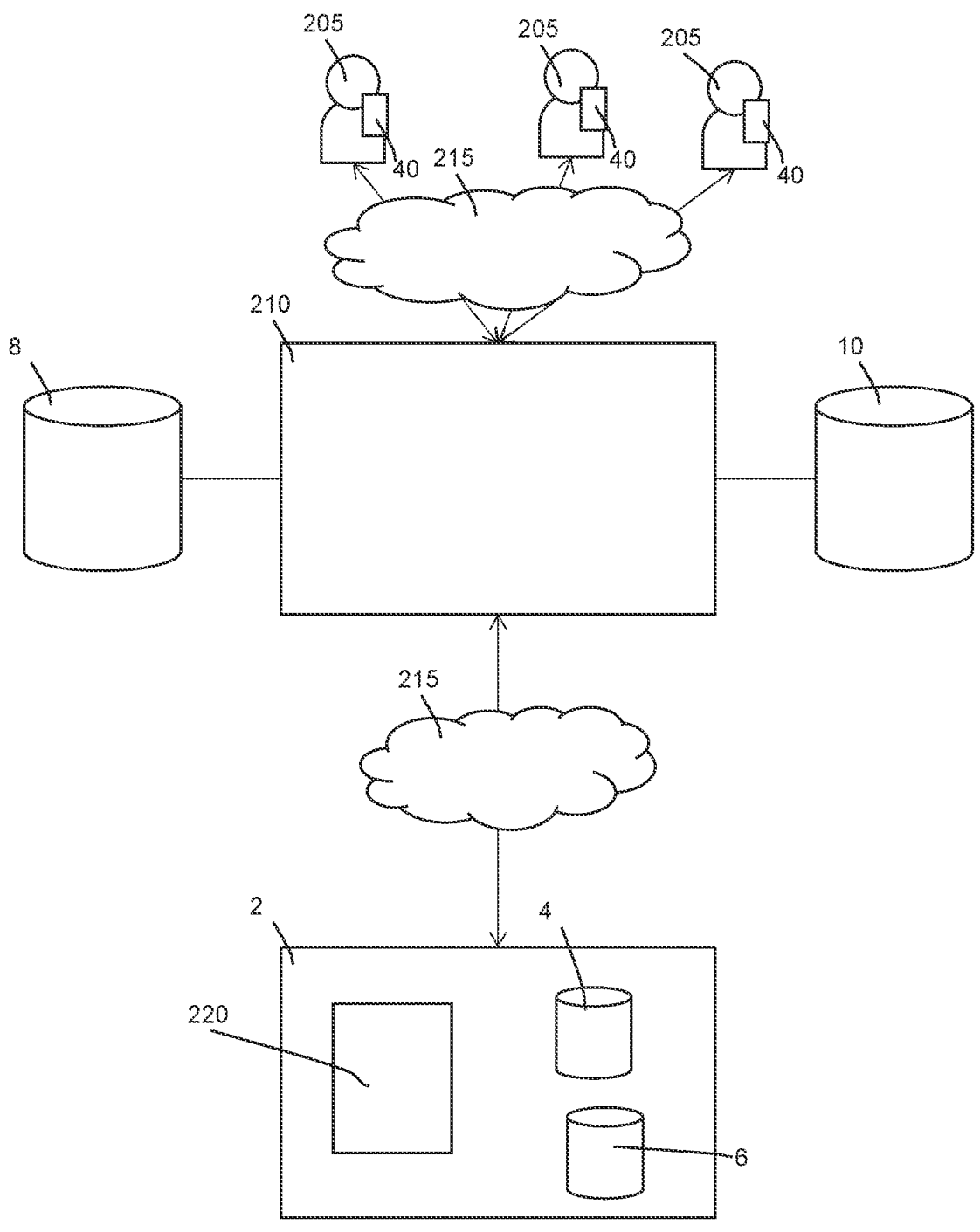
FIG. 3 is a simplified schematic of an alternative system arrangement to that of FIG. 2.

FIG. 1 shows a schematic diagram of a system 1 that comprises a user experience (UX) engine 12 for configuring user content selection interfaces that allow users 205 (see FIGS. 2 and 3) to navigate and select content from a content service provider (210, also shown in FIGS. 2 and 3). In particular, the user experience (UX) engine 12 can be used to provide customized user content selection interfaces that are customized or otherwise specifically configured to a specific user 205 or group of users 205. The customization comprises customizing the selection of which groups of content are presented and the order in which groups of content are presented to a user 205 or groups of users 205 so that groups of content more likely to be of interest to the user 205 are presented or presented earlier or in preference to groups of content that are less likely to be of interest to that user 205.

In the example of FIG. 1, the user experience (UX) engine 12 is provided as part of a more general recommendation system 2 that comprises a content recommendation engine (CRE) 22 that can apply a set of processes to determine, in real time, content recommendations for a user 205 based on user data and available content. This arrangement can be beneficial as there may be some cross-over in the data utilized such that the UX engine 12 can in some examples share or otherwise leverage data used by the CRE 22, which can minimize data storage and other services required to operate both systems. However, the disclosure is not limited to this arrangement and in other examples the UX engine 12 can be provided as a dedicated stand-alone system or as part of a content provider's user interface system or in another suitable component of a content provision system or associated support system.

The content recommendation engine (CRE) 22 in this example is provided as part of an affinity profile generation system, which is operable to generate affinity profiles for users 205 based on first party data in the form of, for example, user actions performed in relation to their selection, viewing and other actions in relation to TV content provided by a TV distribution system, and/or in relation to other content. The recommendation system 2 in the embodiment of FIG. 1 is also able to provide content recommendations to users as well as generating affinity profiles.

Content recommendations may be provided in real time or near real time for tens of thousands, hundreds of thousands, or even millions of users. However, as noted above, this is an optional arrangement, and the UX engine 12 need not be provided as part of such a recommendation system 2 and can be provided as a stand-alone system or as part of a system with other functionality.

The UX engine 12 is configured to take into account previous interactions that the user 205 has had with user content selection interfaces. These could include interactions the user 205 has had with the user content selection interface that the system 1 is currently looking to configure and/or with other user content selection interfaces. Beneficially, such user interactions may comprise first party data in the form of, for example, user actions performed in relation to their selection, viewing and other actions in relation to content such as but not limited to TV content provided by a TV distribution system or other types of content.

Some example modes of operation are described below in relation to PVRs associated with users, but content may be provided or accessible via any suitable devices, for example set-top boxes, smartphones, PCs or tablets or any other suitable content delivery mechanism.

As noted above, the system 1 in the embodiment of FIG. 1 comprises the recommendation system 2 that includes the content recommendation engine (CRE) 22, the UX engine 12 and a user profile module 26, each of which is linked to a first storage resource in the form of a hard disk storage device 4, which is used to store various user data, including user actions. The recommendation system 2 is also communicatively linked to a second storage resource in the form of a local storage device that includes at least one cache, for example a user cache 6. In the embodiment of FIG. 1 the local storage device is in the form of RAM 7 but any suitable storage device may be used in alternative embodiments. The user cache 6 may be used for temporary storage of user data obtained from the hard disk storage device 4 during a user session.

As discussed further below, recommendation system 2 is able to communicate, either directly or indirectly, and either via wired or wireless connection, with very large numbers of users 205 or user devices 40 and to provide recommendations for or derived from such users 205 or their user devices 40. Other than some PVRs, which are shown schematically in FIG. 1, only a few user devices 40 are shown in FIG. 1 for clarity, but it will be appreciated that more or less user devices 40 could be present. The user devices 40 could include, as examples only, a user's mobile phone, smart TV, tablet computer, laptop, smart watch or other suitable viewing device. Although the user devices 40 could belong to the user 205, they could also comprise any other device that the user 205 is logged into.

The recommendation system 2, and specifically the CRE 22, the UX engine 12 and the user profile module 26 are also linked to sources of information concerning available content, in this case an EPG module 8 and a Video-on-Demand (VOD) module 10 which provide information about content available to a user 205 from a service provider system 210 (see FIGS. 2 and 3) via an EPG (for example, scheduled TV programs on a set of channels) and via a VoD service. In alternative embodiments, a variety of other sources of content may be available as well as, or in addition to, EPG and VoD content, for example internet content and/or any suitable streamed content via wired or wireless connection. The EPG is provided as an example of a content selection interface that allows users 205 to look for content available from the service provider and to select content, e.g. for download, streaming and/or viewing. However, the present disclosure is not limited to EPGs and could also be applied to other content selection interfaces, e.g. for music provision services, audio book services, film streaming services, creator content, book or article selection interfaces, amongst others. The content may comprise video, audio, text, images, or other data.

In the embodiment of FIG. 1, the EPG module 8, the UX engine 12, the user profile module 26, the VOD module 10, the CRE 22, the user cache 6, the PVR communication module 12, and a user learning module 24 are implemented in a server. The server includes communication circuitry that enables communication between the server, or appropriate components of the server, with each of the user devices 40, and with the content sources, for example a TV service operator or other content service operator. However, other arrangements are possible, e.g. one or more of the above components may be distributed over other system or more generally in the cloud.

Any other suitable implementation of the EPG module 8, the VOD module 10, the UX engine 12, the user profile module 26, the content recommendation engine (CRE) 22, the user cache 6, the PVR communication module 12, and the user learning module 24 may be provided in alternative embodiments, for example they may be implemented in any software, hardware or any suitable combination of software and hardware. Furthermore, in alternative embodiments any one of the components described in relation to the embodiment of FIG. 1 or other embodiments may be combined with any other one(s) of the components, or any one of the components may be split into multiple components providing the same or similar functionality.

The EPG module 8 and the VOD module 10 obtain information concerning available content from the content sources, for example a TV service operator or other content service operator. The content information comprises metadata of content, for example, television program metadata. The metadata may be representative of a variety of different content parameters or properties, for example but not limited to program title, time, duration, content type, program categorization, actor names, genre, release date, episode number, series number. It is a feature of the embodiment that the metadata stored at the EPG module 8 and the VOD module 10 may also be enriched with additional metadata, for example by the operator of the system, such that additional metadata to that provided by the content sources or other external sources may be stored.

In the embodiment of FIG. 1 the system 1 operates together with three sources of content for a user device 40: real-time linear television, for example terrestrial or satellite broadcast television; one or more video-on-demand (VOD) services, and pre-recorded video content stored on one or more personal video recorders (PVR). In alternative embodiments further sources of content as well as or instead of those shown may be used.

The operation of the system 1 is controlled by the recommendation system 2. As can be seen in FIG. 1, the recommendation system 2 is configured to communicate with the one or more content information modules such as the electronic program guide (EPG) module 8 and VoD module 10. The recommendation system 2 is also configured to communicate with the user cache 6 local to the recommendation system 2, the hard disk storage resource 4 and the one or more PVRs. A data access layer provides a communication interface between the recommendation system 2 and the hard disk storage resource 4. A personal video recorder (PVR) communication module 12 provides a communication interface between the one or more PVRs 20*a*, 20*b*, . . . 20*z* and the affinity profile and recommendation system 2.

As discussed in more detail below, the user profile module 26 is operable to use first party data obtained by an operator of the system to determine user activity profiles of individual users 205 or sets of users 205, which are representative of actions of a user 205 with respect to content selection interfaces.

The content recommendation engine (CRE) 22 can apply a set of processes to determine, in real time, content recommendations for a user 205 based on user data and available content.

The user learning module 24 receives data indicative of selections or other actions by a user 205 and builds up a set of user data, for example comprising or representing a user history or profile, which is stored in the hard disk storage 4, and which is used in generating personalized recommendations for the user 205.

The UX engine 12 allows for the content selection interface to be configured, which may be at least in part responsive to input from an operative, such as an operative of a content provider service, and/or at least in part automatically, or any combination thereof. The UX engine 12 allows groups of content to be created. The user content selection interface presents the content items for selection by the user 205 in the groups of content. In an example, each group of content may correspond to a different carousel in a carousel type user interface, but the present disclosure is not limited to this. In some examples, at least one or each group of content may represent a different theme, such as war movies, romances, action movies, nature programs, news and current affairs, and the like. However, this need not be the case, and at least one or each group could be simply selected by the operative or another party.

The UX engine 12 also allows the way in which the groups of content are provided or displayed to the user 205 to be customized to that individual user 205 or group of users 205. For example, the UX engine 12 allows customization, e.g. automated customization, of the order in which groups of content are provided to the user in the user content selection interface, which may be an order in which the carousels corresponding to different groups are provided in the content selection interface. In some examples, this comprises allowing selected groups of content to be fixed in a set place in an ordering of the groups of content. In examples, this comprises allowing the UX engine 12 to determine a customized ordering of at least some or all of the groups of content for each user 205 or group of users 205, which may be based at least in part on groups of content that the user 205 or group of users 205 have previously interacted with in some way, e.g. whilst using a user content selection interface.

The ordering of the groups of content (and content recommendations in examples in which the UX engine 12 is part of a recommendation system 2) can be based on user actions, wherein at least some of those user actions include user interaction with content recommendation user interfaces. FIG. 1 shows user actions and requests for recommendations or ordering of content being communicated directly to the recommendation system 2 from the user devices 40. In addition to receiving requests for recommendations of content or ordering of groups of content, the recommendation system 2 is configured to log user activity. By logging user activity and storing activity over an extended period of time, the recommendation system 2 and the hard disk storage 4 can build up an overall picture of the actions of a plurality of users relating to their interactions with content selection interfaces. User actions are turned into learn actions by the user learning module 24 to be processed by the user profile module 26, the UX engine 12 and the content recommendation engine 22.

In examples of the present disclosure, groups of content 510 presented in the user content selection interface for user selection could include one or more of: groups selected by the operative or another party and automatically created groups of content. At least the groups of content created by the operative or another party may be presented at fixed locations and/or in fixed order in the user content selection interface, the locations and/or order being selected by the operative or another party. Beneficially, the UX engine 12 can determine, based on the user actions, the likely popularity of one or preferably a plurality of groups of content, such as the groups of content created by the operative or another party. The UX engine 12 presents the groups of content along with an indication of the determined likely popularity of each group of content in the UX engine 12 user interface.

This can enhance the selection and/or ordering of the groups of content, such as the groups of content created by the operative or another party, e.g. by allowing the groups of content to be selected or ordered based on the determined likely popularity of the group. For example, groups more likely to be popular to a user 205 or to a group of users 205 can be selected for presentation in the user content selection interface for that user 205 or group of users 205 in preference to groups that are determined to be less likely to be of interest to the user 205 or groups of users 205, or at least ordered to be presented sooner or otherwise in preference to groups that are determined to be less likely to be of interest to the user 205 or groups of users 205. The selection may be manual, e.g. by the operative or another party, and/or may be automatic, e.g. as a default selection or ordering of the groups of content. In some examples, some locations or slots in the user content selection interface are reserved for manually created or selected groups of content and the selection and/or ordering of groups of content for these reserved slots may be selected based on the groups that are determined to be more likely to be of interest to the user 205 or groups of users 205.

The system of FIG. 1 is configured to operate with a plurality of user devices 40 each associated with at least one user 205 (e.g. belonging to the user 205 or into which the user 205 is logged in or from which the user is otherwise identifiable). The plurality of user devices 40 may comprise a large number of devices 40, for example thousands, tens or hundreds of thousands, or even millions of devices 40. Each user device 40 may be any device or combination of devices that is configured to enable a user to view or otherwise consume content. For example, each user device 40 may be an internet-enabled device and/or a device for providing video or other content on demand and/or a device capable of receiving a real-time linear television broadcast signal. The user device 40 may be a mobile device, for example a tablet, a smart phone or a laptop. Alternatively, the user device 40 may not be mobile, for example, an internet browser enabled computing device, a smart television or a set-top box. The user device 40 may also have an in-built or associated PVR for recording and storing content in some embodiments.

The user 205 may be a viewer of the user device 40. Alternatively or additionally, the user 205 may be a subscriber and/or customer of a service accessible through the user device 40.

The user cache 6 is coupled to the user profile module 26, the UX engine 12 and the content recommendations engine (CRE) 22, and data stored by the user cache 6 may be used by the user profile module 26, the UX engine 12 and the content recommendations engine 22. The recommendation system 2 can access data stored on the user cache 6. The user cache 6 may be provided in random access memory (RAM) 7.

The hard disk storage 4 is communicatively coupled to the recommendation system 2. The hard disk storage 4 stores data for use by the recommendation system 2, including user actions, also referred to as user activity. The hard disk storage 4 is configured to store one or more databases. Entries from the databases on the hard disk storage resource 4 can be retrieved by requests made through a data access layer. Entries in the databases may also be updated via the data access layer.

The database(s) at the hard disk storage 4 store user data that is used by the user profile module 26 to generate and update user profiles for users 205. That data can be used by the content recommendation engine (CRE) 22 to generate recommendations for configuring the content selection interface for the specific user 205 and/or can be used by the UX engine 12 to order groups of content for presentation on the content selection interface. In the embodiment of FIG. 1 a set of database tables is provided that store information concerning the users 205.

In the embodiment of FIG. 1, the tables may include at least one user service table 36 that represents user service requirements, and at least one user profile table 30 that includes user attribute data that may be included in a user profile. A user profile may include, for example, the following attributes: unique identifiers, for example a user identifier, a subscriber identifier, an anonymous session identifier; one or more unique geographic identifiers; a flag indicating whether or not the user has a PVR; a flag indicating whether or not the user is in debt; a flag indicating whether or not the user has opted out of receiving marketing material; one or more codes indicating one or more preferred languages of the user; a flag indicating if the user has opted out of receiving personal recommendations; the age of the user; the name of the user, the gender of the user and/or the like.

In the embodiment of FIG. 1, the tables may include various user learning tables that include data representing user 205 actions, also referred to as user activity, relating to content selection interfaces. Examples of user 205 actions that constitute user activity that can be collected include one or more or each of: selecting content from a group of content or a related group of content; scrolling through content in a group of content or a related group of content; hovering a cursor for greater than a threshold period over a group of content or a related group of content; pausing scrolling for greater than a threshold period through groups of content whilst a group of content or a related group of content is displayed on a user interface; downloading content that is in a group of content or related group of content; having watched at least part of content that is in a group of content or related group of content; bookmarking content that is in a group of content or related group of content; browsing content that is in a group of content or related group of content; recording content that is in a group of content or related group of content; adding content that is in a group of content or related group of content to virtual shopping basket or otherwise selecting for purchase or potential purchase; watching or listening to a trailer for content that is in a group of content or related group of content; playing content that is in a group of content or related group of content on a user device; purchasing content that is in a group of content or related group of content; clicking on or otherwise selecting content that is in a group of content or related group of content from a list of search results; remotely recording content that is in a group of content or related group of content; setting a reminder for content that is in a group of content or related group of content; liking, making a favorite or otherwise adding to a list content that is in a group of content or related group of content; disliking content that is in a group of content or related group of content; messaging about content that is in a group of content or related group of content; posting on social media about content that is in a group of content or related group of content; playing purchased content that is in a group of content or related group of content; stopping watching or playing content that is in a group of content or related group of content; and/or rating content that is in a group of content or related group of content, from amongst others.

For example, if a user 205 selects a program or other item of content from a content selection interface and views or otherwise consumes it for greater than a threshold period of time then a learn action is generated and at least one user data item for that user is stored in at least one of the tables. The data item may include various data including for example start and stop viewing time, time slot identifier, program identifier, which group of content the content belongs, at least some metadata concerning the program (although such metadata may be stored separately as content data rather than user data in some embodiments, and linked to or otherwise accessed if required, for example by the program name or other identifier). The user learning module 24 determines whether user data should be stored in the tables in respect of a particular user action or set of actions. For example, if a user only views a program for a very short period of time, for instance if they are channel surfing, then user data is optionally not stored in the user learning tables in respect of that action. User data can be stored in respect of a variety of different user actions or events, for example selecting, viewing, recording or searching for content or any of those listed above or others that would be apparent to a skilled person.

In the embodiment of FIG. 1 a large part of the user data comprises user history or user action data that represent user actions over a significant period of time. In various embodiments, there is a limit to how long user data is kept or used. For example in the embodiment of FIG. 1 after a threshold period, for example six months after being collected, items of user data are deleted. Thus, in some embodiments the user data for a particular user 205 may include only relatively recent user action data, although the amounts of data may still be substantial.

Although a particular system arrangement is shown in FIG. 1, there are various system arrangements that could be used.

FIG. 2 shows a "middleware" arrangement in which the recommendation system 2 sits as "middleware" between the users 205 and systems of a content provider 210. The recommendation system 2 is implemented by processing resource 220 (which may comprise one or more processors) with the storage device 4 and user cache 6. In some examples, the recommendation system 2 can be implemented by a cloud computing system, by one or more servers or other suitable enterprise level computing system. In this arrangement, systems that implement the recommendation system 2 receive data sent from the user devices 40 of the users 205 that represents the user actions/user activity taken by the user 205 that are relevant to the content selection interface, such as but not limited to actions taken by the user 205 during operation of the content selection interface, including one or more of the user actions listed above. The user devices 40 also provide a user ID that can be used to identify the user 205 to allow the provision of a content selection interface that is customized for that user 205. The user devices 40 communicate the data over a network, such as the cloud 215, to the recommendation system 2. The recommendation system 2 records the user actions in order to generate learn actions and build and update a user profile that can be used to configure and customize a content selection interface for the user 205. The recommendation system 2 can communicate the requests and other data from the user devices 40 to the content providers systems 210 in order to provide the content to the user devices 40.

Other system arrangements that provide similar functionality to customize the content selection interfaces for users are possible. FIG. 3 shows an alternative system configuration in a "backend" processing arrangement. In this arrangement, the user devices 40 interface directly with the systems of a content provider 210, which implements the content selection interface and handles the requests from the user devices 40. User interaction data from the user devices 40 is provided by the systems of a content provider 210 to the recommendation system 2 in order for the recommendation system 2 to identify learn actions and build user profiles for at least partly customizing the content selection interface for that user. The recommendation system 2 provides the data for customizing the content selection interface for that user or for a group of users that include that user, including an ordering with which to present at least some of the groups of content in the user selection interface, to the systems of a content provider 210 for providing in the content selection interface for that user 205 or group of users that include that user 205.

Figure 4:
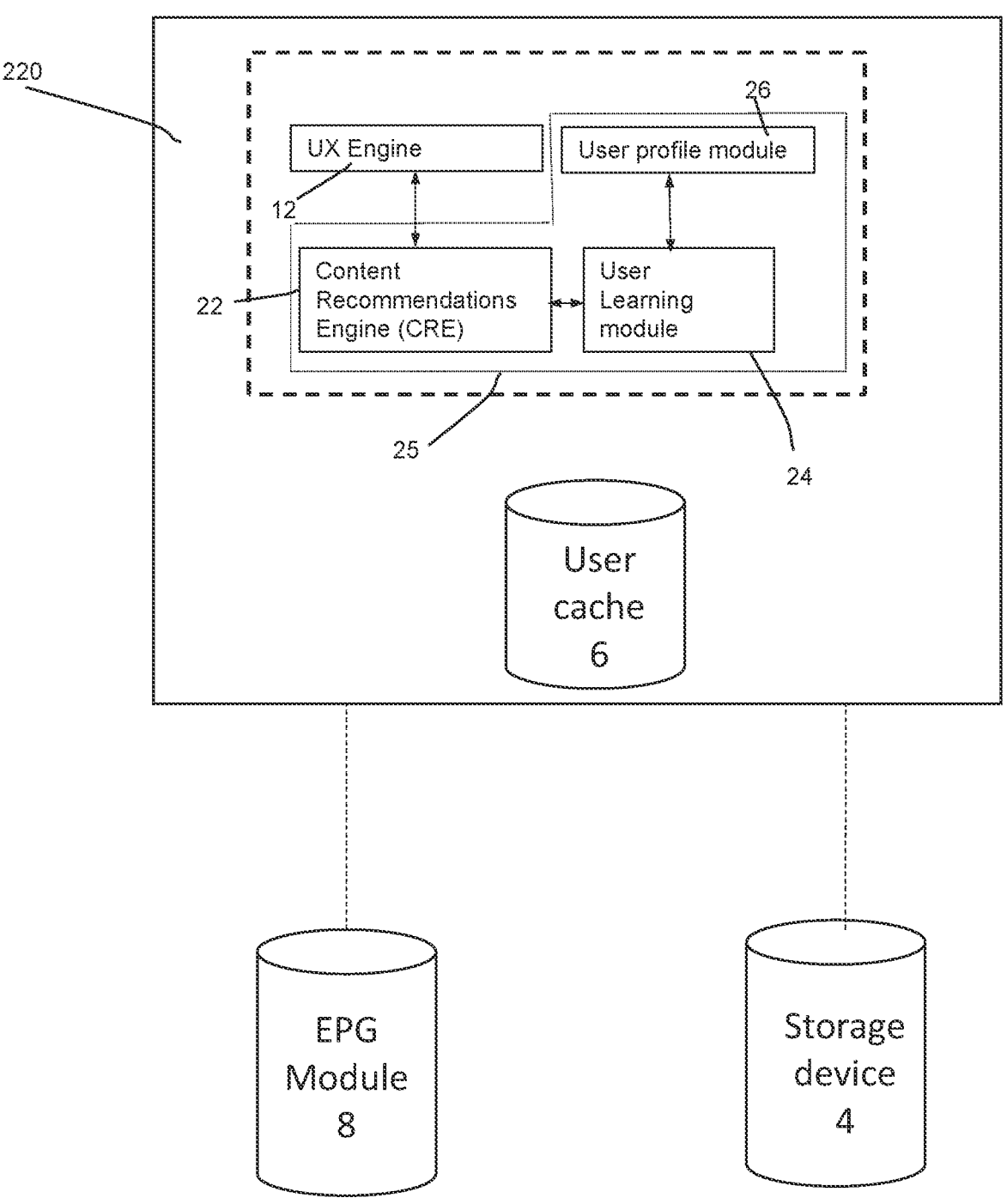
FIG. 4 is a schematic of a system for configuring a content selection interface.

FIG. 4 shows an arrangement of processing resource 220 for implementing the recommendation system 2, including the UX engine 12 and in some examples also the recommendation service 25 that includes the CRE 22, the user learning module 24 and the user profile module 26. The processing resource can optionally comprise one or more processors, FPGAs, ASICS or the like, which may be provided in a single machine or distributed over a plurality of machines, and may be locally arranged or remote from each other and connected over a network. The processing resource 220 is configured to communicate with content databases, such as the EPG module 8, to retrieve content available from the content provider. The processing resource 220 comprises rapid access storage, such as user cache 6, which may be implemented in RAM or SSD storage to provide fast access to user profiles and actions that the processing resource is currently, and will next be, performing operations on. The processing resource is also configured to communicate with external storage such as storage device 4 on which user actions and profiles are stored and can be retrieved into the use cache 6 when needed by the processing resource 220. The UX engine 12 can be accessed by the operatives of the content provider (or other suitable users) to configure the user content selection interface provided to user devices 40 for navigating and accessing the content available from the content provider. As part of this, the UX engine 12 can identify groups of content for presentation to the user 205 and order the groups based on the user actions collected for that user 205 for providing a suitably customized content selection interface to the user 205 on their user device 40, as will be described in more detail below.

Figure 5:
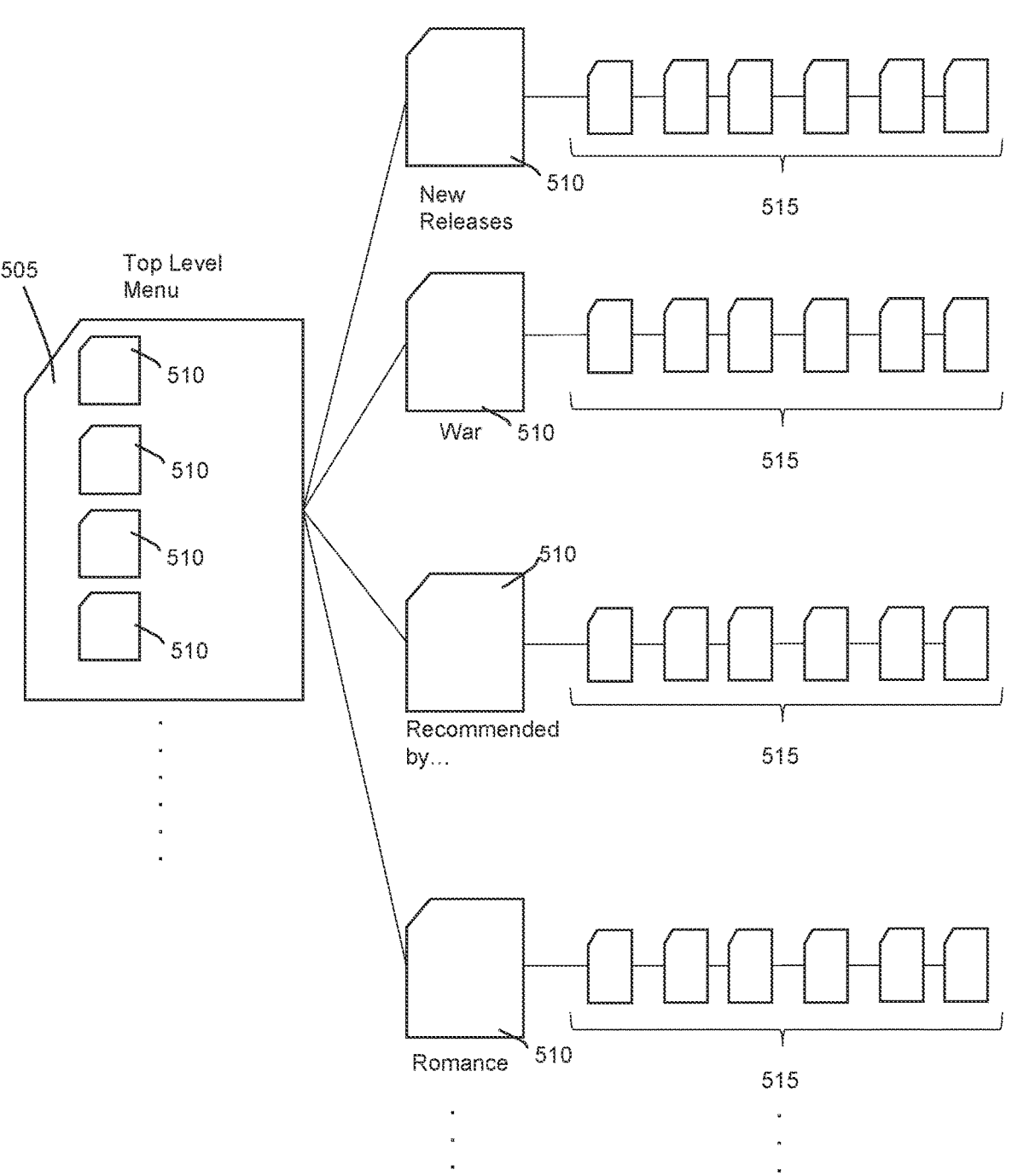
FIG. 5 is a schematic of a data structure for a content selection interface.

FIG. 5 shows a file structure for storing the groups of content. A high level folder 505 can contain all or at least a plurality of the groups of content 510 available for a given content provider or a different service of a content provider 210. The service provider may have one or multiple high level folders (e.g. corresponding to different services, subscriptions, seasons or the like or simply may contain different groups of content that are in some way related or grouped together for ease of organization or administration). The dots in the Figure indicate the possibility of one or more additional similar features. Each high level folder 505 may apply common settings to the groups of content 510 within that folder 505. For example, a flag for a high level folder 505 can be set to "fixed", which would mean that the positions of all groups of content 510 in that folder 505 in an ordering of groups of content 510 for display on the content selection interface would be fixed or a flag for a high level folder 505 can be set to "customizable", which would mean that the positions of all groups of content 510 in that folder 505 in an ordering of groups of content 510 for display on the content selection interface would be dynamically customized for that user 205 or group of users 205 based at least in part on a number of user actions recorder for that user in relation to the relevant group of content 510. In some examples, the high level folder may be a top level or root folder but could be any folder that would be useful to organize the groups of content. This arrangement may allow operatives to more quickly configure content selection interfaces by allowing settings to be quickly applied to multiple groups of content 510 by arranging them into folders 505.

Each high level folder 505 comprises a plurality of groups of content 510. As noted above, each group of content 510 may simply comprise a plurality of content items 515 selected by an operative or may comprise content items 515 that correspond to a common theme associated with the group, such as "new releases", "war", "recommended by . . . <<recommender>>", "recently added", "previously viewed", "romance", "liked", "suitable for age <<age of user>>", "recommended "favorites", "because you watched . . . <<related content>>", and/or the like. The UX engine 12 can tailor the order in which at least some of the groups of content 510 are provided to the user 205 in the content selection interface, based at least in part on user actions, e.g. number of user actions, relevant to particular groups of content 510 made during their use of the content selection interface. Importantly, whilst the content recommendation engine (CRE) 22 is configured to recommend content items 515 that may be of interest to the user 205 (e.g. which can be used to generate the groups of content 510 that may be of interest to the user 205, for example by selecting content items 515 for each group 510), the UX engine 12 is operable to optimize the order that the groups 510 are presented to a user on a content selection interface. Thus, the CRE 22 has a purpose distinct from that of the UX engine 12.

In some examples, the ordering and/or position that at least some of the groups are provided in the user content selection interface is fixed or selectable, e.g. by an operative of the UX engine 12. Beneficially, the UX engine can be configured to determine a likely interest by a user 205 or by a group of users 205, which may be an entire user base of a content provider or other target group of users, for example. The likely interest can be determined at least in part on the user data for that user 205 or group of users 205. The likely interest for each group of content that is selectable or created by the operative of the UX engine is displayed in a user interface of the UX engine 12. In this way, the operative can select a fixed position or ordering of at least some of the groups of content or can experiment with the creation of groups of content so that groups of content that are more likely to be of interest to the user 205 or the group of users 205 is provided or provided more preferentially to other groups of content.

Figures 6, 7:
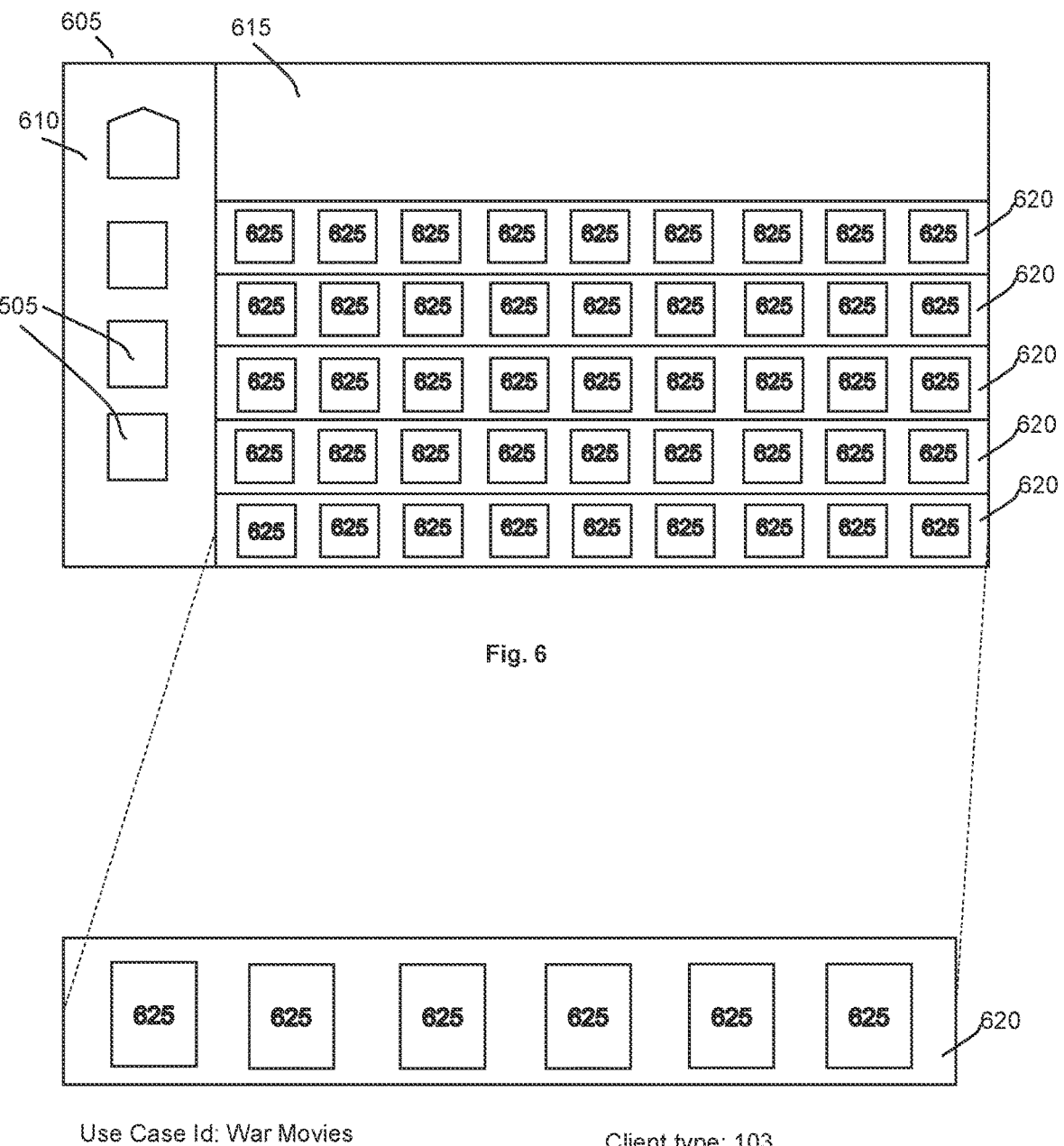
FIG. 6 is a schematic of a content selection interface.
FIG. 7 is schematic of a group of content displayed on the content selection interface of FIG. 6.

FIG. 6 shows an example of a content selection interface 605. In this example, the content selection interface 605 optionally comprises a high level menu bar 610 down one side that can contain functions such as "home page", "search" and/or may show the high level folders 505 that are available for selection. In some examples, the high level menu bar 610 can be used to switch content provision services or users or switch high level folders 505, which may impact the groups of content provided by the content selection interface 605. That is, the groups of content 510 displayed and available for content selection will automatically update on selection of a service, user or high level folder 505 in the high level menu bar 610 to show groups of content 510 associated with that service, user and/or high level folder 505.

The content selection interface 605 further comprises a headline banner 615 that is optionally always fixed at the top of the content selection interface 605 or at least is provided as the first selectable item in the content selection interface 605 at least until such time as an operative may change the headline banner 615.

Beneath the headline banner 615 is a plurality of carousels 620, each carousel 620 containing a respective group of content 510. In this example, each carousel 620 comprises a plurality of selectable content indications 625, each content indication representing a different contain item 515 that is contained in the group of content 510 represented by that carousel 520. Thus, in the content selection user interface, each carousel 620 corresponds to and shows a corresponding different group of content 510, and each content indication 625 represents and indicates a different item of content 515 from the group of content 510 that can be selected by the user 205 by selecting the corresponding content indication 625. The content indication 625 could comprise a thumbnail image, text or the like.

The user 205 can scroll up and down through the carousels 620, with new carousels 620 representing different groups of content 510 appearing at the bottom and the top carousel 620 disappearing at the top as the user scrolls down through the carousels 620 and vice versa as the user 205 scrolls up through the carousels 620. When the user 205 identifies a carousel 620 corresponding to a group of content 510 of interest, the user 205 can scroll from side to side along the carousel 620 to scroll through the selectable content indications 615 representing the items of content 515 in the group of content 510 associated with that carousel 620. A detail view of a carousel 620 representing a group of content 510 from the content selection interface 605 is shown in FIG. 7, which shows a plurality of selectable content indications 625, each representing a different user selectable content item 515. The content indications 625 may comprise a thumbnail showing an image of the item of content 515 and/or text indicating the name of the content 515 or the like. When the user identifies the content 515 represented by the content indication 625 that they want to consume, then the user 205 selects the desired content indication 625 from that carousel 620 to request provision (e.g. download, streaming or viewing) of the item of content 515 represented by that content indication 625. Of course, there are many arrangements of content selection interfaces and the present disclosure is not limited to the particular arrangement of content selection interface 605 shown in FIGS. 6 and 7. For example, in alternative content selection interfaces, the user 205 can scroll through groups of content 510/carousels 620 horizontally (or in any other direction) and scroll through the content indications 625 representing content items 515 vertically (or in another direction that is different from the direction through which the groups of content are scrolled through). Some content selection interfaces may be arranged in a hierarchical structure, with the user able to drill down through groups of groups of content 510, into groups of content 510 and finally down into content items 515. However, various other arrangements would be apparent to a person skilled in the art and to which the concepts of the present disclosure could be applied and the present disclosure is not limited to the content selection interface 605 shown in FIGS. 6 and 7.

The content items 515 in the groups 510 or the groups 510 themselves can optionally be picked by an operative or selected by the content recommendation engine (CRE) 22 for that user.

Figure 8:
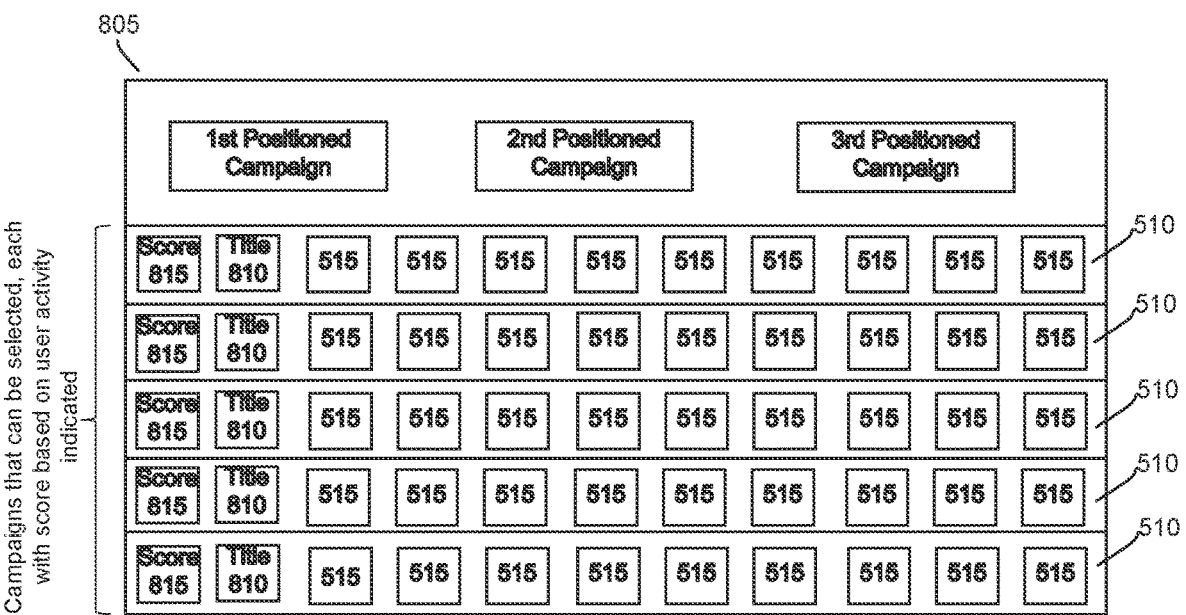
FIG. 8 is a schematic of a configuration interface of a content selection interface configuration system for configuring the content selection interface of FIG. 6.

FIG. 8 shows an example of a group selection user interface 805 of the UX engine 12 that is usable by an operative of the UX engine 12 to select, position and order groups of content 510 for provision in the content selection interface 605. That is, the group selection user interface 805 of the UX engine 12 is operable by an operative of the UX engine 12 to configure the presentation of the groups of content 510 in the carrousels 620 of the content selection interface 605 for users 205 or groups of users. The groups of content 510 could be created by the operative or could be existing groups of content 510 that had been previously created or automatically created based on an algorithm, or the like. Each group of content 510 has a label (e.g. title 810) indicative of a theme or subject of the group of content 510.

As described above, the recommendation system 2 is configured to determine a score 815 for each group of content 510, the score 815 being indicative of a likely interest in the group of content by a user 205 or by a group of users, such as a customer base of a content provider or some other defined group of users. The score 815 is based at least in part on user data for that user 205 or group of users, such as that described above and used by the content recommendation system 22. The user data can be considered data representative of or associated with user activity. The user data generally comprises first party data and includes data associated with the user's interactions with a content selection user interface, as described above. The user data includes details of content 515 or groups of content 510 that the user 205 or users in the group of users have interacted with, including themes and/or other metadata relating to that content 515 or group of content 510. For example, if the user 205 has a high proportion of interactions with content 515 of a type "romance" as represented in metadata, then groups of content 510 having a high amount of content 515 with metadata indicating a type "romance" may also score highly. Similarly, if a user 205 has a number interactions with content that has metadata indicating that it features "Joan Smith", then groups of content 510 that also have content 515 whose metadata indicates that it features "Joan Smith" may also be scored highly. These are provided as examples to assist with understanding, and are not limiting.

In examples, the scores for each group of content 510 that is selectable or created by the operative are determined at least in part from the user data by a ranking algorithm that ranks the available groups of content with respect to user activity, which may be based on metadata associated with the content 515 in the group of content 510 and/or with the group of content 510 itself relative to metadata associated with previous user interactions with a content interface stored as part of the user data. The user data may comprise at least one aspect, property or descriptor of the content that users 205 have previously interacted with when using a content selection interface, and that can be extracted from metadata associated with that content 515. Examples of these are described above.

In the example user interface shown in FIG. 8, each group of content 510 that is selectable by the operative is displayed with the score for that group of content 510. In this way, the operative can preferentially select groups of content more likely to be of interest for provision in the content selection interface 605 for that user 205 or group of users or at least place groups of content 510 more likely to be of interest in positions that are displayed sooner, are more prominent and/or more easily accessible. This allows the operative to create a better content selection interface 605 for that user 205 or group of users 205.

Although the above gives an advantageous example of how the scores could be used, the present disclosure is not limited to this. In another example, the groups of content 510 may be ordered automatically by the UX engine 12 based on the scores for each group. For example, as a default or initial arrangement, the UX engine 12 may automatically order the groups of content 510 in the content selection interface 605 for that user 205 or group of users based on the score for each group of content determined from the user data for that user 205 or group of users. For example, groups of content having the highest score can be positioned or ordered into the most prominent or easiest accessible positions in the content selection interface 605. The ordering or location may then optionally be over-ridable by manual selections of the operative of the UX interface 12. In another example, the scores can be displayed to guide the operative in creation of groups of content, for example by calculating the score for a group of content in real time when the operative is selecting content for the groups of content based on the content already selected. This may allow the operative to create groups of content more likely to be of interest to the user 205 or group of users.

In the example of FIG. 8, there are three carousels 620 (i.e. positions) available for operative selected groups of content 510, indicated as 820, 825 and 830. The most prominent/easily accessible position 820 can be allocated to a selected group of content 510 having the highest score of the three selected groups of content 510. The next most prominent/easily accessible position 825 can be allocated to a selected group of content 510 having the next highest score of the three selected groups of content 510. The least prominent/least easily accessible position 825 of the three can be allocated to a selected group of content 510 having the lowest score of the three selected groups of content 510.

FIG. 9 shows a process of operation carried out by the recommendation system 2 as part of the implementation of the user interface of the UX engine 12.

In step 905, the groups of content 510 that are selectable using the UX engine are identified. As noted above, this could include existing groups of content 510, groups of content 510 created by the operative using the UX engine 12, automatically created groups of content 510 and/or the like.

In step 910, metadata associated with each of the selectable groups of content 510, which could be metadata associated with the content 515 in the groups of content 510 or with the groups of content 510 themselves. The metadata can indicate any of a wide range of information associated with the content 515 or group of content 510, including the theme or title of the group of content, genre, cast, date, and so on, including information corresponding to any of the user data described above and/or below.

User data associated with a user 205 or group of users (which could be an entire user base of a content provider or a target group of users) is retrieved in step 915. As described above, the user data comprises data derived from previous user interactions with content selection interfaces 605, including content selection, hovering above content, scrolling through a group of content and/or others as described above. The metadata associated with the content and/or groups of content with which that user 205 or group of users has interacted is retrieved.

In step 920, the score for each available group of content 510 is determined based at least in part on the user activity of that user and the data indicating the at least one property of some or all of the content, the score for a group of content being indicative of a likely interest of the content in that group of content to one or more users of the content selection interface. As described above, this may be based at least in part on a similarity of metadata associated with the group of content 510 or the content 515 in that group of content 510 and the metadata of content 515 or groups of content 510 that have previously been interacted with by that user 205 or group of users. The score can optionally be determined using a ranking algorithm that ranks the available groups of content relative to the metadata from the user data (i.e. with the user activity).

Figure 10:
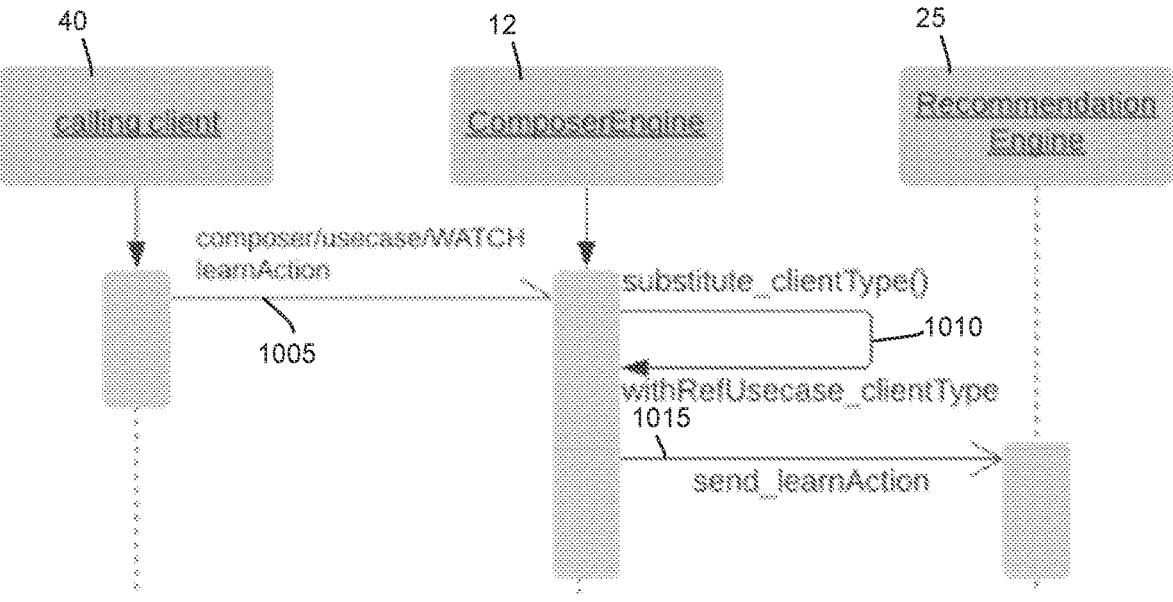
FIG. 10 is method of providing services to a provider of a user content selection interface.

FIG. 10 illustrates the interactions between user devices 40, the UX engine 12 and a recommendation service 25 (see FIGS. 1 to 3) of the recommendation system 2, which comprises at least the user learning module 24 and user profile module 26 that goes to create the user data. When the user 205 interacts with a content selection interface 605 on their user device 40 (i.e. performs a user action), the user device 40 sends 1005 (directly or indirectly) a notification and associated data to the recommendation system 2. The associated data includes at least a user 205 or user device 40 ID, data identifying the action and identifying the content 515 or group of content 510 to which the action related. User actions with the content selection interface 605 are provided to the UX engine 12. The UX engine 12 is configured to identify the content 515 that the user has interacted with and identifies the group or groups of content 510 to which the content 515 belongs and adds this to the metadata in 1010. A learn action linking the user action to the group of content 510 is then sent in step 1015 to the recommendation service 25 for storing in the data storage 4 and for updating the user profile 30. An example of a list of learn actions that reflect user 205 interactions with a content selection interface 605 on their user devices 40 is shown in FIG. 11, which can be stored on the data storage 4 for later use by the UX engine 12. Steps 1005 to 1015 reflect a learning process that comprises the building up of learn actions reflecting the user interaction with content selection interfaces 605 on their user devices 40 that are subsequently used by the UX engine 12 to order the groups of content 510 for display on the content selection interface 605, at least in part by determining a number of the user actions that are relevant to each group of content 510 and ordering the groups of content 510 for display on the content selection interface based on that number.

The system described herein can be used to provide content selection interfaces that may in some examples allow a user to more quickly identify content of interest and to better navigate content available from a content provider system. As groups of content more likely to be of interest may be displayed in preference to, or earlier than, groups of content that are less likely to be of interest, then the user can more quickly identify content of interest without reducing the size of carousels, without excessive scrolling and making better use of limited screen estate to display the content selection interface 605.

Although various specific examples have been described above, these are provided to help understanding of the present disclosure and other possible implementations can be used. For example, although specific arrangements of systems and networks that could be used to implement the concepts disclosed herein are shown in FIGS. 1 to 3, other systems architectures could be used. For example, the UX engine 12 could be provided as a stand-alone system rather than being integrated with the content recommendation engine 22 or integrated into a content provider system rather than being provided as a separate intermediate or backend system.

Method steps described herein can be performed by one or more programmable processors executing a computer program to perform functions of the invention by operating on input data and generating output. Method steps can also be performed by special purpose logic circuitry, e.g., an FPGA (field programmable gate array) or an ASIC (application-specific integrated circuit) or other customized circuitry. Processors suitable for the execution of a computer program include CPUs and microprocessors, and any one or more processors. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g. EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the invention can be implemented with a user device 40 having a screen, e.g., a CRT (cathode ray tube), plasma, LED (light emitting diode) or LCD (liquid crystal display) monitor, for displaying information (e.g. the content selection interface 605) to the user and an input device, e.g., a keyboard, touch screen, a mouse, a trackball, and the like by which the user can provide input to the computer. Other kinds of devices can be used, for example, feedback provided to the user can be any form of sensory feedback, e.g., visual feedback, auditory feedback, or tactile feedback; and input from the user can be received in any form, including acoustic, speech, or tactile input.

As such, the above description of specific embodiments is made by way of example only. A skilled person will appreciate that variations of the described embodiments may be made without departing from the scope of the invention.

What is claimed is:

1. A content selection interface configuration system implemented on a network enabled computing system for configuring content selection interfaces provided on a user device, the content selection interface configured for user selection of content in the groups of content on the user device for consumption, the content selection interface configuration system configured to:

provide a plurality of groups of content, each group of content comprising a plurality of different content;

obtain data indicating at least one property of each of the content of each provided group of content;

obtain user activity, wherein the user activity comprises previous interactions by respective users with content on a content selection interface on a user device; and determine, for each respective user, a score for each group of content of the plurality of groups of content based at least in part on both the user activity of that respective user and the data indicating the at least one property of some or all of the content, wherein each score is indicative of a likely interest of the content in that group of content to that respective user; wherein for each respective user, select and order selected groups of content from the plurality of groups of content based on the determined score for each group of content for that respective user and to subsequently provide the selected one or more groups of content to that respective user's device for customized display for that respective user in which the selected one or more groups of content are displayed according to the order in the content selection interface on that respective user's device that allows user selection of content from the one or more selected groups of content for consumption by the user.

2. The content selection interface configuration system of claim 1, wherein the groups of content are operator created groups of content.

3. The content selection interface configuration system of claim 2, configured to receive input from operators for selecting which groups of content to display and/or for selecting an order of groups of content to display.

4. The content selection interface configuration system of claim 1, wherein the user activity is indicative of an interaction with at least one item of content.

5. The content selection interface configuration system of claim 1, wherein the determining of the score of the groups of content comprises determining a similarity between the at least one property of the content in the group of content with the properties of the content with which the user has interacted.

6. The content selection interface configuration system of claim 1, wherein determining the scores of the groups of content for presentation to the user on the user interface comprises applying a ranking algorithm to the user activity, the ranking algorithm being configured to rank the available groups of content with respect to the user activity; and determining a similarity between the at least one aspect, property or descriptor of the content in the group and the at least one aspect, property or descriptor of the content determined based on the user activity.

7. The content selection interface configuration system of claim 1, configured to select groups of content having a score above a threshold or a set or preset number of groups of content with highest scores.

8. The content selection interface configuration system of claim 1, wherein some positions for groups of content in the content selection interface are allocated or allocatable to operator created groups of content; and the content selection interface configuration system is configured to allocate and/or order the operator created groups according to their score only in the positions for groups of content in the content selection interface allocated or allocatable to operator created groups of content.

9. The content selection interface configuration system of claim 1, configured to implement rules for selecting groups of content, wherein:

at least one of the rules over-rides the selection of content based on the score; and/or at least one of the rules adjusts or weights the score.

10. The content selection interface configuration system of claim 1, at least one of the rules specifies one or more properties of groups of content or the content therein that are not selectable for users or groups of users meeting one or more criteria.

11. The content selection interface according to claim 10, wherein the content within groups of content is ordered according to different criteria to the criteria used to select or order the groups of content.

12. The content selection interface configuration system of claim 1, wherein the content selection interface configuration system is implemented on a server of a content provider or a service provider or as middleware; and the content selection interfaces that are operated to select content are provided on a user device.

13. The content selection interface configuration system of claim 1, wherein the content selection interface comprise a plurality of scrollable carousels, each carousel comprising indications of the content of the associated group of content to the user that are selectable to provide the content to the user.

14. The content selection interface configuration system of claim 1, wherein the content selection interface configuration system is comprised in one of: a content provider system, a middleware system, or a 3<sup>rd</sup> party system of a service provider; whereas the content selection interfaces that are operable to select content are provided on the user device on which the content selected using the content selection interface is provided.

15. The content selection interface configuration system of claim 14, wherein the network enabled computing system is also comprised in one of: a provider side system, middleware system, or a 3<sup>rd</sup> party system of a service provider to a content provider, or another device that is not the user device.

16. The content selection interface configuration system of claim 1, wherein the content selection interface is comprised in an electronic program guide, EPG, provided on the user device and the content comprises films or television programs.

17. A method implemented using a network enabled computing system, the method comprising configuring configuration user interfaces implemented on a network enabled computing system for creating or selecting groups of content for provision in a content selection interface provided on a user device, the content selection interface configured for user selection of content in the groups of content on the user device for consumption, the configuring being performed by or using a content selection interface configuration system, the method comprising:

providing one or more groups of content, each group of content comprising a plurality of different content;

obtaining data indicating at least one property of each of the content of each group of content;

obtaining user activity, wherein the user activity comprises previous interactions by respective users with content on a content selection interface on a user device;

determining, for each respective user, a score for each group of content of the plurality of groups of content based at least in part on both the user activity of that respective user and the data indicating the at least one property of some or all of the content, wherein each score is indicative of a likely interest of the content in that group of content to that respective user;

for each respective user, selecting and ordering a selection of one or more selected groups of content from the plurality of groups of content based on the determined score for each group of content for that respective user and subsequently providing the selected one or more groups of content to that respective user's device for customized display for that respective user in which the selected one or more groups of content are displayed according to the order in the content selection interface on that respective user's device that allows user selection of content from the one or more selected groups of content for consumption by the user.

18. A non-transitory computer-readable medium that comprises computer-readable instructions that are executable on a network enabled computing system to configure a content selection interface on a user device, the configuration comprising:

providing one or more groups of content, each group of content comprising a plurality of content;

obtaining data indicating at least one property of each of the content items of each group of content;

obtaining user activity, wherein the user activity comprises previous interactions by respective users with content on a content selection interface on a user device;

determining, for each respective user, a score for each group of content of the plurality of groups of content based at least in part on both the user activity of that respective user and the data indicating the at least one property of some or all of the content, wherein each score is indicative of a likely interest of the content in that group of content to that respective user; and for each respective user, selecting and ordering a selection of one or more selected groups of content from the plurality of groups of content based on the determined score for each group of content for that respective user and subsequently provide the selected one or more groups of content to that respective user's device for customized display for that respective user in which the selected one or more groups of content are displayed according to the order in the content selection interface on that respective user's device that allows user selection of content from the one or more selected groups of content for consumption by the user.

* * * * *